(12) United States Patent
Reeve

(10) Patent No.: US 8,311,696 B2
(45) Date of Patent: Nov. 13, 2012

(54) OPTICAL TRACKING VEHICLE CONTROL SYSTEM AND METHOD

(75) Inventor: David R. Reeve, Chapel Hill (AU)

(73) Assignee: Hemisphere GPS LLC, Calgary, Alberta (CA)

( * ) Notice: Subject to any disclaimer, the term of this patent is extended or adjusted under 35 U.S.C. 154(b) by 492 days.

(21) Appl. No.: 12/504,779

(22) Filed: Jul. 17, 2009

(65) Prior Publication Data

US 2011/0015817 A1    Jan. 20, 2011

(51) Int. Cl.
*G05D 1/00* (2006.01)

(52) U.S. Cl. .......... 701/23; 701/470; 701/480; 701/514; 701/519; 342/357.26; 342/357.37

(58) Field of Classification Search .............. 701/23, 701/28, 41, 50, 25–26, 400, 408, 468–472, 701/479–480, 494–495, 510, 519; 342/357.26, 342/357.37
See application file for complete search history.

(56) References Cited

U.S. PATENT DOCUMENTS

| | | |
|---|---|---|
| 3,585,537 A | 6/1971 | Rennick et al. |
| 3,596,228 A | 7/1971 | Reed, Jr. et al. |
| 3,727,710 A | 4/1973 | Sanders et al. |
| 3,815,272 A | 6/1974 | Marleau |
| 3,899,028 A | 8/1975 | Morris et al. |
| 3,987,456 A | 10/1976 | Gelin |
| 4,132,272 A | 1/1979 | Holloway et al. |
| 4,170,776 A | 10/1979 | MacDoran et al. |
| 4,180,133 A | 12/1979 | Collogan et al. |
| 4,398,162 A | 8/1983 | Nagai |
| 4,453,614 A | 6/1984 | Allen et al. |
| 4,529,990 A | 7/1985 | Brunner |
| 4,637,474 A | 1/1987 | Leonard |
| 4,667,203 A | 5/1987 | Counselman, III |
| 4,689,556 A | 8/1987 | Cedrone |
| 4,694,264 A | 9/1987 | Owens et al. |

(Continued)

FOREIGN PATENT DOCUMENTS

JP    07244150    9/1995

(Continued)

OTHER PUBLICATIONS

"International Search Report and Written Opinion", *International Searching Authority*, PCT/US08/88070, Feb. 9, 2009.

(Continued)

*Primary Examiner* — Thomas Black
*Assistant Examiner* — Ce Li
(74) *Attorney, Agent, or Firm* — Law Office of Mark Brown, LLC; Mark E. Brown

(57) ABSTRACT

An optical tracking vehicle control system includes a controller adapted for computing vehicle guidance signals and a guidance subsystem adapted for receiving the guidance signals from the controller and for guiding the vehicle. An optical movement sensor is mounted on the vehicle in optical contact with a travel surface being traversed by the vehicle. The optical movement sensor is connected to the controller and provides vehicle movement signals thereto for use by the controller in computing vehicle position. The optical movement sensor can be either mounted on a gimbal for movement independent of the vehicle, or, alternatively, multiple optical movement sensors can be provided for detecting yaw movements. GNSS and inertial vehicle position tracking subsystems are also provided. Still further, a method of tracking a vehicle with an optical movement sensor is provided.

7 Claims, 14 Drawing Sheets

U.S. PATENT DOCUMENTS

| | | | |
|---|---|---|---|
| 4,710,775 A | 12/1987 | Coe | |
| 4,714,435 A | 12/1987 | Stipanuk et al. | |
| 4,739,448 A | 4/1988 | Rowe et al. | |
| 4,751,512 A | 6/1988 | Longaker | |
| 4,769,700 A | 9/1988 | Pryor | |
| 4,785,463 A | 11/1988 | Janc et al. | |
| 4,802,545 A | 2/1989 | Nystuen et al. | |
| 4,812,991 A | 3/1989 | Hatch | |
| 4,858,132 A | 8/1989 | Holmquist | |
| 4,864,320 A | 9/1989 | Munson et al. | |
| 4,894,662 A | 1/1990 | Counselman | |
| 4,916,577 A | 4/1990 | Dawkins | |
| 4,918,607 A | 4/1990 | Wible | |
| 4,963,889 A | 10/1990 | Hatch | |
| 5,031,704 A | 7/1991 | Fleischer et al. | |
| 5,100,229 A | 3/1992 | Lundberg et al. | |
| 5,134,407 A | 7/1992 | Lorenz et al. | |
| 5,148,179 A | 9/1992 | Allison | |
| 5,152,347 A | 10/1992 | Miller | |
| 5,155,490 A | 10/1992 | Spradley et al. | |
| 5,155,493 A | 10/1992 | Thursby et al. | |
| 5,156,219 A | 10/1992 | Schmidt et al. | |
| 5,165,109 A | 11/1992 | Han et al. | |
| 5,173,715 A | 12/1992 | Rodal et al. | |
| 5,177,489 A | 1/1993 | Hatch | |
| 5,185,610 A | 2/1993 | Ward et al. | |
| 5,191,351 A | 3/1993 | Hofer et al. | |
| 5,202,829 A | 4/1993 | Geier | |
| 5,207,239 A | 5/1993 | Schwitalia | |
| 5,239,669 A | 8/1993 | Mason et al. | |
| 5,255,756 A | 10/1993 | Follmer et al. | |
| 5,268,695 A | 12/1993 | Dentinger et al. | |
| 5,293,170 A | 3/1994 | Lorenz et al. | |
| 5,294,970 A | 3/1994 | Dornbusch et al. | |
| 5,296,861 A | 3/1994 | Knight | |
| 5,311,149 A | 5/1994 | Wagner et al. | |
| 5,323,322 A | 6/1994 | Mueller et al. | |
| 5,334,987 A | 8/1994 | Teach | |
| 5,343,209 A | 8/1994 | Sennott et al. | |
| 5,345,245 A | 9/1994 | Ishikawa et al. | |
| 5,359,332 A | 10/1994 | Allison et al. | |
| 5,361,212 A | 11/1994 | Class et al. | |
| 5,365,447 A | 11/1994 | Dennis | |
| 5,369,589 A | 11/1994 | Steiner | |
| 5,375,059 A | 12/1994 | Kyrtsos et al. | |
| 5,390,124 A | 2/1995 | Kyrtsos | |
| 5,390,125 A | 2/1995 | Sennott et al. | |
| 5,390,207 A | 2/1995 | Fenton et al. | |
| 5,416,712 A | 5/1995 | Geier et al. | |
| 5,442,363 A | 8/1995 | Remondi | |
| 5,444,453 A | 8/1995 | Lalezari | |
| 5,451,964 A | 9/1995 | Babu | |
| 5,467,282 A | 11/1995 | Dennis | |
| 5,471,217 A | 11/1995 | Hatch et al. | |
| 5,476,147 A | 12/1995 | Fixemer | |
| 5,477,228 A | 12/1995 | Tiwari et al. | |
| 5,477,458 A | 12/1995 | Loomis | |
| 5,490,073 A | 2/1996 | Kyrtsos | |
| 5,491,636 A | 2/1996 | Robertson | |
| 5,495,257 A | 2/1996 | Loomis | |
| 5,504,482 A | 4/1996 | Schreder | |
| 5,511,623 A | 4/1996 | Frasier | |
| 5,519,620 A | 5/1996 | Talbot et al. | |
| 5,521,610 A | 5/1996 | Rodal | |
| 5,523,761 A | 6/1996 | Gildea | |
| 5,534,875 A | 7/1996 | Diefes et al. | |
| 5,543,804 A | 8/1996 | Buchler et al. | |
| 5,546,093 A | 8/1996 | Gudat et al. | |
| 5,548,293 A | 8/1996 | Cohen et al. | |
| 5,561,432 A | 10/1996 | Knight | |
| 5,563,786 A | 10/1996 | Torii | |
| 5,568,152 A | 10/1996 | Janky et al. | |
| 5,568,162 A | 10/1996 | Samsel et al. | |
| 5,583,513 A | 12/1996 | Cohen | |
| 5,589,835 A | 12/1996 | Gildea et al. | |
| 5,592,382 A | 1/1997 | Colley | |
| 5,596,328 A | 1/1997 | Stangeland et al. | |
| 5,600,670 A | 2/1997 | Turney | |
| 5,604,506 A | 2/1997 | Rodal | |
| 5,608,393 A | 3/1997 | Hartman | |
| 5,610,522 A | 3/1997 | Locatelli et al. | |
| 5,610,616 A | 3/1997 | Vallot et al. | |
| 5,610,845 A | 3/1997 | Slabinski | |
| 5,612,883 A | 3/1997 | Shaffer et al. | |
| 5,615,116 A | 3/1997 | Gudat et al. | |
| 5,617,100 A | 4/1997 | Akiyoshi et al. | |
| 5,617,317 A | 4/1997 | Ignagni | |
| 5,621,646 A | 4/1997 | Enge et al. | |
| 5,638,077 A | 6/1997 | Martin | |
| 5,644,139 A | 7/1997 | Allen et al. | |
| 5,664,632 A | 9/1997 | Frasier | |
| 5,673,491 A | 10/1997 | Brenna et al. | |
| 5,680,140 A | 10/1997 | Loomis | |
| 5,684,696 A | 11/1997 | Rao et al. | |
| 5,706,015 A | 1/1998 | Chen et al. | |
| 5,717,593 A | 2/1998 | Gvili | |
| 5,725,230 A | 3/1998 | Walkup | |
| 5,731,786 A | 3/1998 | Abraham et al. | |
| 5,739,785 A | 4/1998 | Allison et al. | |
| 5,757,316 A | 5/1998 | Buchler | |
| 5,765,123 A | 6/1998 | Nimura et al. | |
| 5,777,578 A | 7/1998 | Chang et al. | |
| 5,810,095 A | 9/1998 | Orbach et al. | |
| 5,828,336 A | 10/1998 | Yunck et al. | |
| 5,838,562 A | 11/1998 | Gudat et al. | |
| 5,854,987 A | 12/1998 | Sekine et al. | |
| 5,862,501 A | 1/1999 | Talbot et al. | |
| 5,864,315 A | 1/1999 | Welles et al. | |
| 5,864,318 A | 1/1999 | Cozenza et al. | |
| 5,875,408 A | 2/1999 | Bendett et al. | |
| 5,877,725 A | 3/1999 | Kalafus | |
| 5,890,091 A | 3/1999 | Talbot et al. | |
| 5,899,957 A | 5/1999 | Loomis | |
| 5,906,645 A | 5/1999 | Kagawa et al. | |
| 5,912,798 A | 6/1999 | Chu | |
| 5,914,685 A | 6/1999 | Kozlov et al. | |
| 5,917,448 A | 6/1999 | Mickelson | |
| 5,918,558 A | 7/1999 | Susag | |
| 5,919,242 A | 7/1999 | Greatline et al. | |
| 5,923,270 A | 7/1999 | Sampo et al. | |
| 5,926,079 A | 7/1999 | Heine et al. | |
| 5,927,603 A | 7/1999 | McNabb | |
| 5,928,309 A | 7/1999 | Korver et al. | |
| 5,929,721 A | 7/1999 | Munn et al. | |
| 5,933,110 A | 8/1999 | Tang | |
| 5,935,183 A | 8/1999 | Sahm et al. | |
| 5,936,573 A | 8/1999 | Smith | |
| 5,940,026 A | 8/1999 | Popeck | |
| 5,941,317 A | 8/1999 | Mansur | |
| 5,943,008 A | 8/1999 | Van Dusseldorp | |
| 5,944,770 A | 8/1999 | Enge et al. | |
| 5,945,917 A | 8/1999 | Harry | |
| 5,949,371 A | 9/1999 | Nichols | |
| 5,955,973 A | 9/1999 | Anderson | |
| 5,956,250 A | 9/1999 | Gudat et al. | |
| 5,969,670 A | 10/1999 | Kalafus et al. | |
| 5,987,383 A | 11/1999 | Keller et al. | |
| 6,014,101 A | 1/2000 | Loomis | |
| 6,014,608 A | 1/2000 | Seo | |
| 6,018,313 A | 1/2000 | Englemayer et al. | |
| 6,023,239 A | 2/2000 | Kovach | |
| 6,052,647 A | 4/2000 | Parkinson et al. | |
| 6,055,477 A | 4/2000 | McBurney et al. | |
| 6,057,800 A | 5/2000 | Yang et al. | |
| 6,061,390 A | 5/2000 | Meehan et al. | |
| 6,061,632 A | 5/2000 | Dreier | |
| 6,062,317 A | 5/2000 | Gharsalli | |
| 6,069,583 A | 5/2000 | Silvestrin et al. | |
| 6,076,612 A | 6/2000 | Carr et al. | |
| 6,081,171 A | 6/2000 | Ella | |
| 6,100,842 A | 8/2000 | Dreier et al. | |
| 6,104,978 A | 8/2000 | Harrison et al. | |
| 6,122,595 A | 9/2000 | Varley et al. | |
| 6,128,574 A | 10/2000 | Diekhans | |
| 6,144,335 A | 11/2000 | Rogers | |
| 6,191,730 B1 | 2/2001 | Nelson, Jr. | |
| 6,191,733 B1 | 2/2001 | Dizchavez | |

| | | |
|---|---|---|
| 6,198,430 B1 | 3/2001 | Hwang et al. |
| 6,198,992 B1 | 3/2001 | Winslow |
| 6,199,000 B1 | 3/2001 | Keller et al. |
| 6,205,401 B1 | 3/2001 | Pickhard et al. |
| 6,215,828 B1 | 4/2001 | Signell et al. |
| 6,229,479 B1 | 5/2001 | Kozlov et al. |
| 6,230,097 B1 | 5/2001 | Dance et al. |
| 6,233,511 B1 | 5/2001 | Berger et al. |
| 6,236,916 B1 | 5/2001 | Staub et al. |
| 6,236,924 B1 | 5/2001 | Motz |
| 6,253,160 B1 | 6/2001 | Hanseder |
| 6,256,583 B1 | 7/2001 | Sutton |
| 6,259,398 B1 | 7/2001 | Riley |
| 6,266,595 B1 | 7/2001 | Greatline et al. |
| 6,275,705 B1 * | 8/2001 | Drane et al. ................ 455/456.2 |
| 6,285,320 B1 | 9/2001 | Olster et al. |
| 6,292,132 B1 | 9/2001 | Wilson |
| 6,307,505 B1 | 10/2001 | Green |
| 6,313,788 B1 | 11/2001 | Wilson |
| 6,314,348 B1 | 11/2001 | Winslow |
| 6,325,684 B1 | 12/2001 | Knight |
| 6,336,066 B1 | 1/2002 | Pellenc et al. |
| 6,345,231 B2 | 2/2002 | Quincke |
| 6,356,602 B1 | 3/2002 | Rodal et al. |
| 6,377,889 B1 | 4/2002 | Soest |
| 6,380,888 B1 | 4/2002 | Kucik |
| 6,389,345 B2 | 5/2002 | Phelps |
| 6,392,589 B1 | 5/2002 | Rogers et al. |
| 6,397,147 B1 | 5/2002 | Whitehead |
| 6,415,229 B1 | 7/2002 | Diekhans |
| 6,418,031 B1 | 7/2002 | Archambeault |
| 6,421,003 B1 | 7/2002 | Riley et al. |
| 6,424,915 B1 | 7/2002 | Fukuda et al. |
| 6,431,576 B1 | 8/2002 | Viaud et al. |
| 6,434,462 B1 | 8/2002 | Bevly et al. |
| 6,445,983 B1 | 9/2002 | Dickson et al. |
| 6,445,990 B1 | 9/2002 | Manring |
| 6,449,558 B1 | 9/2002 | Small |
| 6,463,091 B1 | 10/2002 | Zhodzicshsky et al. |
| 6,463,374 B1 | 10/2002 | Keller et al. |
| 6,466,871 B1 | 10/2002 | Reisman et al. |
| 6,469,663 B1 | 10/2002 | Whitehead et al. |
| 6,484,097 B2 | 11/2002 | Fuchs et al. |
| 6,501,422 B1 | 12/2002 | Nichols |
| 6,515,619 B1 | 2/2003 | McKay, Jr. |
| 6,516,271 B2 | 2/2003 | Upadhyaya et al. |
| 6,539,303 B2 | 3/2003 | McClure et al. |
| 6,542,077 B2 | 4/2003 | Joao |
| 6,549,835 B2 | 4/2003 | Deguchi |
| 6,553,299 B1 | 4/2003 | Keller et al. |
| 6,553,300 B2 | 4/2003 | Ma et al. |
| 6,553,311 B2 | 4/2003 | Ahearn et al. |
| 6,570,534 B2 | 5/2003 | Cohen et al. |
| 6,577,952 B2 | 6/2003 | Geier et al. |
| 6,587,761 B2 | 7/2003 | Kumar |
| 6,606,542 B2 | 8/2003 | Hauwiller et al. |
| 6,611,228 B2 | 8/2003 | Toda et al. |
| 6,611,754 B2 | 8/2003 | Klein |
| 6,611,755 B1 | 8/2003 | Coffee et al. |
| 6,622,091 B2 | 9/2003 | Perlmutter et al. |
| 6,631,394 B1 | 10/2003 | Ronkka et al. |
| 6,631,916 B1 | 10/2003 | Miller |
| 6,643,576 B1 | 11/2003 | O'Connor et al. |
| 6,646,603 B2 | 11/2003 | Dooley et al. |
| 6,657,875 B1 | 12/2003 | Zeng et al. |
| 6,671,587 B2 | 12/2003 | Hrovat et al. |
| 6,686,878 B1 | 2/2004 | Lange |
| 6,688,403 B2 | 2/2004 | Bernhardt et al. |
| 6,703,973 B1 | 3/2004 | Nichols |
| 6,711,501 B2 | 3/2004 | McClure et al. |
| 6,721,638 B2 | 4/2004 | Zeitler |
| 6,732,024 B2 | 5/2004 | Rekow et al. |
| 6,744,404 B1 | 6/2004 | Whitehead et al. |
| 6,754,584 B2 | 6/2004 | Pinto et al. |
| 6,774,843 B2 | 8/2004 | Takahashi |
| 6,792,380 B2 | 9/2004 | Toda |
| 6,819,269 B2 | 11/2004 | Flick |
| 6,822,314 B2 | 11/2004 | Beasom |
| 6,865,465 B2 | 3/2005 | McClure |
| 6,865,484 B2 | 3/2005 | Miyasaka et al. |
| 6,879,283 B1 | 4/2005 | Bird et al. |
| 6,900,992 B2 | 5/2005 | Kelly et al. |
| 6,922,635 B2 | 7/2005 | Rorabaugh |
| 6,931,233 B1 | 8/2005 | Tso et al. |
| 6,961,018 B2 | 11/2005 | Heppe et al. |
| 6,967,538 B2 | 11/2005 | Woo |
| 6,990,399 B2 | 1/2006 | Hrazdera et al. |
| 7,006,032 B2 | 2/2006 | King et al. |
| 7,026,982 B2 | 4/2006 | Toda et al. |
| 7,027,918 B2 | 4/2006 | Zimmerman et al. |
| 7,031,725 B2 | 4/2006 | Rorabaugh |
| 7,089,099 B2 | 8/2006 | Shostak et al. |
| 7,142,956 B2 | 11/2006 | Heiniger et al. |
| 7,155,335 B2 | 12/2006 | Rennels |
| 7,162,348 B2 | 1/2007 | McClure et al. |
| 7,191,061 B2 | 3/2007 | McKay et al. |
| 7,221,314 B2 | 5/2007 | Brabec et al. |
| 7,231,290 B2 | 6/2007 | Steichen et al. |
| 7,248,211 B2 | 7/2007 | Hatch et al. |
| 7,271,766 B2 | 9/2007 | Zimmerman et al. |
| 7,277,784 B2 | 10/2007 | Weiss |
| 7,292,186 B2 | 11/2007 | Miller et al. |
| 7,324,915 B2 | 1/2008 | Altmann |
| 7,358,896 B2 | 4/2008 | Gradincic et al. |
| 7,373,231 B2 | 5/2008 | McClure et al. |
| 7,388,539 B2 | 6/2008 | Whitehead et al. |
| 7,395,769 B2 | 7/2008 | Jensen |
| 7,400,956 B1 * | 7/2008 | Feller et al. ..................... 701/41 |
| 7,428,259 B2 | 9/2008 | Wang et al. |
| 7,437,230 B2 | 10/2008 | McClure et al. |
| 7,451,030 B2 | 11/2008 | Eglington et al. |
| 7,479,900 B2 | 1/2009 | Horstemeyer |
| 7,505,848 B2 | 3/2009 | Flann et al. |
| 7,522,099 B2 | 4/2009 | Zhodzishsky et al. |
| 7,522,100 B2 | 4/2009 | Yang et al. |
| 7,571,029 B2 | 8/2009 | Dai et al. |
| 7,689,354 B2 | 3/2010 | Heiniger et al. |
| 2001/0004601 A1 * | 6/2001 | Drane et al. .................. 455/456 |
| 2003/0014171 A1 | 1/2003 | Ma et al. |
| 2003/0093210 A1 | 5/2003 | Kondo et al. |
| 2003/0187560 A1 | 10/2003 | Keller et al. |
| 2003/0208319 A1 | 11/2003 | Ell et al. |
| 2004/0039514 A1 | 2/2004 | Steichen et al. |
| 2004/0186644 A1 * | 9/2004 | McClure et al. ................ 701/50 |
| 2004/0212533 A1 | 10/2004 | Whitehead et al. |
| 2005/0080559 A1 | 4/2005 | Ishibashi et al. |
| 2005/0225955 A1 | 10/2005 | Grebenkemper et al. |
| 2005/0265494 A1 | 12/2005 | Goodlings |
| 2006/0031664 A1 | 2/2006 | Wilson et al. |
| 2006/0095172 A1 * | 5/2006 | Abramovitch et al. .......... 701/28 |
| 2006/0167600 A1 | 7/2006 | Nelson et al. |
| 2006/0206246 A1 | 9/2006 | Walker |
| 2006/0215739 A1 | 9/2006 | Williamson et al. |
| 2007/0069924 A1 * | 3/2007 | Goren ........................... 340/988 |
| 2007/0078570 A1 | 4/2007 | Dai et al. |
| 2007/0088447 A1 | 4/2007 | Stothert et al. |
| 2007/0112700 A1 * | 5/2007 | Den Haan et al. ............... 706/14 |
| 2007/0121708 A1 | 5/2007 | Simpson |
| 2007/0205940 A1 | 9/2007 | Yang et al. |
| 2007/0285308 A1 | 12/2007 | Bauregger et al. |
| 2008/0129586 A1 | 6/2008 | Martin |
| 2008/0204312 A1 | 8/2008 | Euler |
| 2008/0269988 A1 * | 10/2008 | Feller et al. ..................... 701/41 |
| 2008/0284643 A1 * | 11/2008 | Scherzinger et al. .... 342/357.02 |
| 2009/0093959 A1 * | 4/2009 | Scherzinger et al. ......... 701/215 |
| 2009/0160951 A1 * | 6/2009 | Anderson et al. .......... 348/208.4 |
| 2009/0164067 A1 * | 6/2009 | Whitehead et al. ............. 701/41 |
| 2009/0171583 A1 | 7/2009 | DiEsposti |
| 2009/0174597 A1 | 7/2009 | DiLellio et al. |
| 2009/0174622 A1 | 7/2009 | Kanou |
| 2009/0177395 A1 | 7/2009 | Stelpstra |
| 2009/0177399 A1 | 7/2009 | Park et al. |
| 2009/0259397 A1 | 10/2009 | Stanton |
| 2009/0259707 A1 | 10/2009 | Martin et al. |
| 2009/0262014 A1 | 10/2009 | DiEsposti |
| 2009/0262018 A1 | 10/2009 | Vasilyev et al. |
| 2009/0262974 A1 | 10/2009 | Lithopoulos |
| 2009/0265054 A1 | 10/2009 | Basnayake |

| | | | | | | |
|---|---|---|---|---|---|---|
| 2009/0265101 | A1 | 10/2009 | Jow | 2010/0225537 A1 | 9/2010 | Abraham |
| 2009/0265104 | A1 | 10/2009 | Shroff | 2010/0228408 A1 | 9/2010 | Ford |
| 2009/0273372 | A1 | 11/2009 | Brenner | 2010/0228480 A1 | 9/2010 | Lithgow et al. |
| 2009/0273513 | A1 | 11/2009 | Huang | 2010/0231443 A1 | 9/2010 | Whitehead |
| 2009/0274079 | A1 | 11/2009 | Bhatia et al. | 2010/0231446 A1 | 9/2010 | Marshall et al. |
| 2009/0274113 | A1 | 11/2009 | Katz | 2010/0232351 A1 | 9/2010 | Chansarkar et al. |
| 2009/0276155 | A1 | 11/2009 | Jeerage et al. | 2010/0235093 A1 | 9/2010 | Chang |
| 2009/0295633 | A1 | 12/2009 | Pinto et al. | 2010/0238976 A1 | 9/2010 | Young |
| 2009/0295634 | A1 | 12/2009 | Yu et al. | 2010/0241347 A1 | 9/2010 | King et al. |
| 2009/0299550 | A1 | 12/2009 | Baker | 2010/0241353 A1 | 9/2010 | Park |
| 2009/0322597 | A1 | 12/2009 | Medina Herrero et al. | 2010/0241441 A1 | 9/2010 | Page et al. |
| 2009/0322598 | A1 | 12/2009 | Fly et al. | 2010/0241864 A1 | 9/2010 | Kelley et al. |
| 2009/0322600 | A1 | 12/2009 | Whitehead et al. | | | |
| 2009/0322601 | A1 | 12/2009 | Ladd et al. | | | |
| 2009/0322606 | A1 | 12/2009 | Gronemeyer | | | |
| 2009/0326809 | A1 | 12/2009 | Colley et al. | | | |
| 2010/0013703 | A1 | 1/2010 | Tekawy et al. | | | |
| 2010/0026569 | A1 | 2/2010 | Amidi | | | |
| 2010/0030470 | A1 | 2/2010 | Wang et al. | | | |
| 2010/0039316 | A1 | 2/2010 | Gronemeyer et al. | | | |
| 2010/0039318 | A1 | 2/2010 | Kmiecik | | | |
| 2010/0039320 | A1 | 2/2010 | Boyer et al. | | | |
| 2010/0039321 | A1 | 2/2010 | Abraham | | | |
| 2010/0060518 | A1 | 3/2010 | Bar-Sever et al. | | | |
| 2010/0063649 | A1 | 3/2010 | Wu et al. | | | |
| 2010/0084147 | A1 | 4/2010 | Aral | | | |
| 2010/0085249 | A1 | 4/2010 | Ferguson et al. | | | |
| 2010/0085253 | A1 | 4/2010 | Ferguson et al. | | | |
| 2010/0103033 | A1 | 4/2010 | Roh | | | |
| 2010/0103034 | A1 | 4/2010 | Tobe et al. | | | |
| 2010/0103038 | A1 | 4/2010 | Yeh et al. | | | |
| 2010/0103040 | A1 | 4/2010 | Broadbent | | | |
| 2010/0106414 | A1 | 4/2010 | Whitehead | | | |
| 2010/0106445 | A1 | 4/2010 | Kondoh | | | |
| 2010/0109944 | A1 | 5/2010 | Whitehead et al. | | | |
| 2010/0109945 | A1 | 5/2010 | Roh | | | |
| 2010/0109947 | A1 | 5/2010 | Rintanen | | | |
| 2010/0109948 | A1 | 5/2010 | Razoumov et al. | | | |
| 2010/0109950 | A1 | 5/2010 | Roh | | | |
| 2010/0111372 | A1 | 5/2010 | Zheng et al. | | | |
| 2010/0114483 | A1 | 5/2010 | Heo et al. | | | |
| 2010/0117894 | A1 | 5/2010 | Velde et al. | | | |
| 2010/0117899 | A1 | 5/2010 | Papadimitratos et al. | | | |
| 2010/0117900 | A1 | 5/2010 | van Diggelen et al. | | | |
| 2010/0121577 | A1 | 5/2010 | Zhang et al. | | | |
| 2010/0124210 | A1 | 5/2010 | Lo | | | |
| 2010/0124212 | A1 | 5/2010 | Lo | | | |
| 2010/0134354 | A1 | 6/2010 | Lennen | | | |
| 2010/0149025 | A1 | 6/2010 | Meyers et al. | | | |
| 2010/0149030 | A1 | 6/2010 | Verma et al. | | | |
| 2010/0149033 | A1 | 6/2010 | Abraham | | | |
| 2010/0149034 | A1 | 6/2010 | Chen | | | |
| 2010/0149037 | A1 | 6/2010 | Cho | | | |
| 2010/0150284 | A1 | 6/2010 | Fielder et al. | | | |
| 2010/0152949 | A1 | 6/2010 | Nunan et al. | | | |
| 2010/0156709 | A1 | 6/2010 | Zhang et al. | | | |
| 2010/0156712 | A1 | 6/2010 | Pisz et al. | | | |
| 2010/0156718 | A1 | 6/2010 | Chen | | | |
| 2010/0159943 | A1 | 6/2010 | Salmon | | | |
| 2010/0161179 | A1 | 6/2010 | McClure et al. | | | |
| 2010/0161211 | A1 | 6/2010 | Chang | | | |
| 2010/0161568 | A1 | 6/2010 | Xiao | | | |
| 2010/0171660 | A1 | 7/2010 | Shyr et al. | | | |
| 2010/0171757 | A1 | 7/2010 | Melamed | | | |
| 2010/0185364 | A1 | 7/2010 | McClure | | | |
| 2010/0185366 | A1 | 7/2010 | Heiniger et al. | | | |
| 2010/0185389 | A1 | 7/2010 | Woodard | | | |
| 2010/0188285 | A1 | 7/2010 | Collins | | | |
| 2010/0188286 | A1 | 7/2010 | Bickerstaff et al. | | | |
| 2010/0189163 | A1 | 7/2010 | Burgi et al. | | | |
| 2010/0201829 | A1* | 8/2010 | Skoskiewicz et al. ..... 348/211.2 | | | |
| 2010/0207811 | A1 | 8/2010 | Lackey | | | |
| 2010/0210206 | A1 | 8/2010 | Young | | | |
| 2010/0211248 | A1 | 8/2010 | Craig et al. | | | |
| 2010/0211315 | A1 | 8/2010 | Toda | | | |
| 2010/0211316 | A1 | 8/2010 | DaSilva | | | |
| 2010/0220004 | A1 | 9/2010 | Malkos et al. | | | |
| 2010/0220008 | A1 | 9/2010 | Conover et al. | | | |
| 2010/0222076 | A1 | 9/2010 | Poon et al. | | | |

FOREIGN PATENT DOCUMENTS

| | | |
|---|---|---|
| WO | WO9836288 | 8/1998 |
| WO | WO0024239 | 5/2000 |
| WO | WO03019430 | 3/2003 |
| WO | WO2005/119386 | 12/2005 |
| WO | WO2009/066183 | 5/2009 |
| WO | WO-2009082745 | 7/2009 |
| WO | WO2009126587 | 10/2009 |
| WO | WO2009/148638 | 12/2009 |
| WO | WO-2010005945 | 1/2010 |
| WO | WO-2010104782 | 9/2010 |
| WO | WO-2011014431 | 2/2011 |

OTHER PUBLICATIONS

Takac, Frank et al., "SmartRTK: A Novel Method of Processing Standardised RTCM Network RTK Information for High Precision Positioning", *Proceedings of ENC GNSS 2008*, Toulouse, France,(Apr. 22, 2008).

"International Search Report", PCT/US09/33567, (Feb. 9, 2009).

"International Search Report and Written Opinion", PCT/IB2008/003796,, (Jul. 15, 2009).

"International Search Report / Written Opinion", PCT/US09/63594.

"International Search Report", PCT/US09/60668.

"ISR Notification & Written Opinion", PCT/US10/26509, (Apr. 20, 2010),1-7.

"Notification Concerning Transmittal of International Report on Patentability (PCT)", PCT/US2009/049776, (Jan. 20, 2011).

"Notification of Transmittal of International Prelim. Report of Patentability", International Application No. PCT/US09/039686, (Oct. 21, 2010).

"International Search Report and Written Opinion", PCT/US2010/043094, (Sep. 17, 2010).

"Notification of Publication of International Application", WO 2011/014431, (Feb. 3, 2011).

"International Search Report and Written Opinion", PCT/US08/81727, (Dec. 23, 2008).

"International Search Report", PCT/US09/067693, (Jan. 26, 2010).

"International Search Report and Written Opinion", PCT/US10/21334, (Mar. 12, 2010).

Rho, Hyundho et al., "Dual-Frequency GPS Precise Point Positioning with WADGPS Corrections", [retrieved on May 18, 2010]. Retrieved from the Internet: URL: http://gauss.gge.unb.ca/papers.pdf/iongnss2005.rho.wadgps.pdf, (Jul. 12, 2006).

"EUROCONTROL, PEGASUS Technical Notes on SBAS", report [online], Dec. 7, 2004 [retrieved on May 18, 2010]. Retrieved from the Internet: <URL: http://www.icao.int/icao/en/ro/nacc/meetings/2004/gnss/documentation/Pegasus/tn.pdf>, (Dec. 7, 2004), p. 89 paras [0001]-[0004].

"ARINC Engineering Services, Interface Specification IS-GPS-200, Revision D", Online [retrieved on May 18, 2010]. Retrieved from the Internet;<URL: http://www.navcen.uscg.gov/gps/geninfo/IS-GPS-200D.pdf>, (Dec. 7, 2004),.p. 168 para [0001].

Schaer, et al., "Determination and Use of GPS Differential Code Bias Values", Presentation [online]. Revtrieved May 18, 2010. Retrieved from the internet: <http://nng.esoc.esa.de/ws2006/REPR2.pdf>, (May 8, 2006).

"International Search Report", PCT/US10/26509, (Apr. 20, 2010).

Parkinson, Bradford W., et al., "Global Positioning System: Theory and Applications, vol. II" Bradford W. Parkinson and James J. Spiker, Jr., eds., *Global Postioning System: Theory and Applicaitons*, vol. II, 1995, AIAA, Reston, VA, USA, pp. 3-50, (1995),3-50.

"Orthman Manufacturing Co., www.orthman.com/htm;guidance.htm", 2004, regarding the "Tracer Quick-Hitch".

Lin, Dai et al., "Real-time Attitude Determination fro Microsatellite by Lamda Method Combined with Kalman Filtering", *A Collection fof the 22nd AIAA International Communications Satellite Systems Conference and Exhibit Technical Paers* vol. 1, Monetrey, California American Institute of Aeronautics and Astronautics, Inc., (May 2004),136-143.

Xu, Jiangning et al., "An EHW Architecture for Real-Time GPS Attitude Determination Based on Parallel Genetic Algorithm", *The Computer SocietyProceedings of the 2002 NASA/DOD Conference on Evolvable Hardware (EH'02)*, (2002).

Han, Shaowel et al., "Single-Epoch Ambiguity Resolution for Real-Time GPS Attitude Determination with the Aid of One-Dimensional Optical Fiber Gyro", *GPS Solutions*, vol. 3, No. 1, pp. 5-12 (1999) John Wiley & Sons, Inc.

Park, Chansik et al., "Integer Ambiguity Resolution for GPS Based Attitude Determination System", *SICE 1998*, Jul. 29-31, Chiba, 1115-1120.

Last, J. D., et al., "Effect of skywave interference on coverage of radiobeacon DGPS stations", *IEEE Proc.-Radar, Sonar Navig.*, vol. 144, No. 3, Jun. 1997, pp. 163-168.

"International Search Report and Written Opinion", PCT/US2004/015678, filed May 17, 2004, Jun. 21, 2005.

"ISO", 11783 Part 7 Draft Amendment 1 Annex, Paragraphs B.6 and B.7.ISO 11783-7 2004 DAM1, ISO: Mar. 8, 2004.

Kaplan, E D., "Understanding GPS: Principles and Applications", *Artech House*, MA, 1996.

Irsigler, M et al., "PPL Tracking Performance in the Presence of Oscillator Phase Noise", *GPS Solutions*, vol. 5, No. 4, pp. 45-57 (2002).

Ward, Phillip W., "Performance Comparisons Between FLL, PLL and a Novel FLL-Assisted-PLL Carrier Tracking Loop Under RF Interference Conditions", *11th Int. Tech Meeting of the Satellite Division of the U.S. Inst. of Navigation*, Nashville, TN, Sep. 15-18, 783-795, 1998.

Bevly, David M., "Comparison of INS v. Carrier-Phase DGPS for Attitude Determination in the Control of Off-Road Vehicles", *ION 55th Annual Meeting*; Jun. 28-30, 1999; Cambridge, Massachusetts; pp. 497-504.

Keicher, R. et al., "Automatic Guidance for Agricultural Vehicles in Europe", *Computers and Electronics in Agriculture*, vol. 25, (Jan. 2000),169-194.

"International Search Report", PCT/US09/49776, (Aug. 11, 2009).

"International Search Report", PCT/AU/2008/000002, (Feb. 28, 2008).

"International Search Report", PCT/US09/33693, (Mar. 30, 2009).

"International Search Report", PCT/US09/039686, (May 26, 2009).

"International Search Report,", PCT/US09/34376, (Nov. 2, 2009).

* cited by examiner

OPTICAL TRACKING VEHICLE CONTROL SYSTEM AND METHOD

BACKGROUND OF THE INVENTION

1. Field of the Invention

The present invention relates generally to a vehicle control system and method using optical tracking, and in particular to such a system and method for an agricultural vehicle including a towed component comprising an implement.

2. Description of the Related Art

Automatic control of steering ("autosteering") of vehicles is becoming more widespread, especially in agricultural and mining applications. Most commercially available automatic steering systems include a controller that has means for determining, among other things, the position and heading of a vehicle, a computer-based system for comparing the position and heading of the vehicle with a desired position and heading, and a steering control responsive to a control signal issued by the controller when the position and/or heading of the vehicle deviates from the desired position and/or heading.

As used herein, "attitude" generally refers to the heading or orientation (pitch with respect to the Y axis, roll with respect to the X axis and yaw with respect to the Z axis) of the vehicle, or of an implement associated with the vehicle. Other vehicle/implement-related parameters of interest include groundspeed or velocity and position. Position can be defined absolutely in relation to a geo-reference system, or relatively in relation to a fixed position at a known location, such as a base station. A change in one or both of the position and orientation of the vehicle (which can include a towed component, such as an implement or a trailer) can be considered a change in the vehicle's "pose." This includes changes (e.g. different order time derivatives) in attitude and/or position. Attitude and position are generally measured relatively with respect to a particular reference flame that is fixed relative to the area that the vehicle is operating in, or globally with respect to a geo-reference system.

Automatic control systems for controlling steering of a vehicle may include a global navigation satellite system (GNSS, including the global positioning system (GPS)) based system. GNSS-based systems typically include a GNSS receiver mounted on the vehicle that receives signals from constellations of GNSS satellites that orbit the earth. The GNSS receiver can then determine or estimate a location of the vehicle. A number of early automatic steering control systems included GNSS-only systems. These systems suffered from limitations in that signals from the constellation of GNSS satellites are received at a relatively low rate, meaning that the location of the vehicle was also determined from the GNSS system at a relatively low rate. As the vehicle is continually moving, there were significant periods during which the location of the vehicle was not being determined. Accordingly, the vehicles would often deviate from the desired path of travel.

Significant work has also been conducted in respect of using inertial sensors to attempt to control the steering of the vehicle. Inertial sensors include accelerometers and/or gyroscopes that can be used to provide indications as to the attitude and speed (or changes thereto) of the vehicle. Unfortunately, inertial sensors such as accelerometers and gyroscopes suffer from time-varying errors. This is particularly marked in the less expensive inertial sensors used in commercially available vehicle steering control systems. Less expensive inertial sensors are used in commercially available systems principally to reduce the cost of the systems to make them affordable.

U.S. Pat. No. 6,876,920, which is assigned to a common assignee herewith and incorporated herein by reference, describes a vehicle guidance apparatus for guiding a vehicle over a paddock or field along a number of paths, the paths being offset from each other by a predetermined distance. The vehicle guidance apparatus includes a GNSS receiver for periodically receiving data regarding the vehicle's location, and an inertial relative location determining means for generating relative location data along a current path during time periods between receipt of vehicle position data from the GNSS receiver. The apparatus also includes data entry means to enable the entry by an operator of an initial path and a desired offset distance between the paths. Processing means are arranged to generate a continuous guidance signal indicative of errors in the attitude and position of the vehicle relative to one of the paths, the attitude and position being determined by combining corrected GNSS vehicle location data with the relative location data from the inertial relative location determining means.

In the system described in U.S. Pat. No. 6,876,920, the inertial sensor is used to provide a higher data rate than that obtainable from GNSS alone. Although the inertial navigation system (INS) part of the steering control system suffers from errors, in particular a yaw bias, the signals received from the GNSS system are used to correct these errors. Thus, the combination of a GNSS based system and a relatively inexpensive INS navigation system allow for quite accurate control of the position of the vehicle. Although this system allows for accurate vehicle positioning and sound control of the vehicle's steering, difficulties may be experienced if there are prolonged periods of GNSS outage. GNSS outages may occur due to unsuitable weather conditions, the vehicle operating in an area where GNSS signals cannot be accessed, or due to problems with the GNSS receiver. If a period of prolonged GNSS outage occurs, the steering system relies solely upon the INS. Unfortunately, a yaw bias in a relatively inexpensive inertial sensor used in the commercial embodiment of that steering control system can result in errors being introduced into the steering of the vehicle.

Optical computer mice are widely used to control the position of a cursor on a computer screen. Optical computer mice incorporate an optoelectronic sensor that takes successive pictures of the surface on which the mouse operates. Most optical computer mice use a light source to illuminate the surface that is being tracked (i.e. the surface over which the mouse is moving). Changes between one frame and the next are processed using the image processing ability of the chip that is embedded in the mouse. A digital correlation algorithm is used so that the movement of the mouse is translated into corresponding movement of the mouse cursor on the computer screen.

The optical movement sensors used in optical computer mice have high processing capabilities. A number of commercially available optical computer mice include optical mouse sensors that can process successive images of the surface over which the mouse is moving at speeds in excess of 1500 frames per second. The mouse has a small light emitting source that bounces light off the surface and onto a complimentary metal oxide semiconductor (CMOS) sensor. The CMOS sensor sends each image to a digital signal processor (DSP) for analysis. The DSP is able to detect patterns in images and see how those patterns have moved since the previous image. Based on the change in patterns over a sequence of images, the digital signal processor determines how far the mouse has moved in X and Y directions, and sends these corresponding distances to the computer. The computer moves the cursor on the screen based upon the coordinates received from the mouse. This happens hundreds to thousands of times each second, making the cursor appear to move very smoothly.

The chips incorporated into optical computer mice often include photodetectors and an embedded integrated circuit that is used to analyse the digital signals received from the photodetectors. The photodetectors may include an array of photosensors, such as an array of charge coupled devices (CCDs).

U.S. Pat. No. 5,786,804 (incorporated herein by reference), which is assigned to Hewlett-Packard Company, describes a method and system for tracking attitude of a device. The system includes fixing a two-dimensional (2D) array of photosensors to the device and using the array to form a reference frame and a sample frame of images. The fields of view of the sample and reference frames largely overlap, so that there are common image features from frame to flame. Several frames are correlated with the reference frame to detect differences in location of the common features. Based upon detection of correlations of features, an attitudinal signal indicative of pitch, yaw and/or roll is generated. The attitudinal signal is used to manipulate a screen cursor of a display system, such as a remote interactive video system.

SUMMARY OF THE INVENTION

In a first aspect, the present invention provides a control system for controlling movement of a vehicle characterized in that the control system includes an optical movement sensor which scans a surface over which the vehicle is moving and generates a signal indicative of relative movement along an axis of the vehicle and relative movement across an axis of the vehicle, said signal being provided to a controller.

In a second aspect, the present invention provides a control system for controlling movement of a vehicle comprising a controller having a computer memory for storing or generating a desired path of travel, the controller being adapted to receive position and/or heading signals from one or more sensors, the position and/or heading signals enabling the controller to determine a position and/or heading of the vehicle relative to a desired path of travel, the controller signals to a steering control mechanism in response to the determined position and/or heading of the vehicle, wherein the position and/or heading signals from the one or more sensors include a signal generated by an optical movement sensor configured to scan a surface during travel of the vehicle, the optical movement sensor generating a signal indicative of relative movement along an axis of the vehicle and relative movement across an axis of the vehicle. The surface that is scanned by the optical movement sensor is suitably a surface over which the vehicle is travelling. Suitably, the optical movement sensor scans a surface that is close to or under the vehicle, during travel of the vehicle over the surface.

The optical movement sensor may comprise the operative part of an optical computer mouse. Therefore, in saying that the optical movement sensor "scans" the surface over which the vehicle moves, where the optical movement sensor comprises the operative part of an optical computer mouse it will be understood that the optical movement sensor receives successive images of the surface over which the vehicle is moving. One part or other of the control system will then detect patterns in the images, and uses the change in the patterns between successive images to obtain information regarding the movement of the vehicle.

The optical movement sensor may comprise an illumination source and an illumination detector. The optical movement sensor may comprise an optical movement sensor integrated circuit.

As noted above, the optical movement sensor may comprise the operative part from an optical computer mouse. Alternatively, the optical movement sensor may be adapted from or derived from the operative part of an optical computer mouse. The optical movement sensor may use a light source to illuminate the surface that is being tracked (i.e. the surface over which the vehicle is moving).

Changes between one frame and the next may be processed by an image processing part of a chip embedded in the optical movement sensor and this may translate the movement across the surface of the optical movement sensor (which will generally be mounted to the vehicle) into movement along two axes. Alternatively the image processing may be performed by processing means separate from the optical movement sensor. For example, the signals received by the optical movement sensor may be conveyed to a separate microprocessor with graphics processing capabilities for processing.

The optical movement sensor may include an optical movement sensing circuit that tracks movement in a fashion similar to the optical movement sensing circuits used to track movement in computer mice. The person skilled in the art will readily appreciate how such optical movement sensing circuits analyse data and provide signals indicative of movement of the sensor across the surface. For this reason, further discussion as to the actual algorithms used in the optical movement sensing circuits need not be provided. Suitably, the optical movement sensing circuit may comprise an optical movement sensing integrated circuit. Such optical movement sensing integrated circuits are readily available from a number of suppliers.

In some embodiments, the control system of the present invention may further comprise one or more inertial sensors for providing further signals regarding the vehicle's attitude and position (or changes thereto) to the controller. Accelerometers and rate gyroscopes are examples of inertial sensors that may be used. The inertial sensors may form part of or comprise an inertial navigation system (INS), a dynamic measurement unit (DMU), an inertial sensor assembly (ISA), or an attitude heading reference system (AHRS). These are well-known to persons skilled in the art and need not be described further. The inertial sensors may be used in conjunction with other navigation sensors, such as magnetometers; or vehicle based sensors such as steering angle sensors, or wheel speed encoders.

Inertial sensors, such as rate gyroscopes and accelerometers, can suffer from time varying errors that can propagate through to create errors in the vehicle's calculated attitude and/or position. These errors can be sufficiently acute that to prevent providing the controller with significantly inaccurate measures of the vehicle's attitude and/or position, it is preferable (and often necessary) for the control system to also receive signals regarding the vehicle's attitude and/or position (or changes thereto) from a source that is independent of the inertial sensors. These separate signals can be used to compensate for the errors in the inertial sensor signals using known signal processing techniques.

It is common to use GNSS signals (which provide information regarding the vehicle's location) to compensate for the errors in the inertial sensor signals. However, the present invention opens up the possibility of providing a control system that includes the optical movement sensor and one or an assembly of inertial sensors (and possibly including one or more other vehicle sensors as well). In other words, in some embodiments of the present invention, the signals provided by the optical movement sensor may be used to compensate for the errors in the inertial sensor signals instead of or in addition to the GNSS signals.

In embodiments such as those described in the previous paragraph, a single optical movement sensor may generally be sufficient to compensate for the errors in inertial sensors such as accelerometers which measure rates of change in linear displacement. However, a single optical movement sensor may not be sufficient to compensate for errors in inertial sensors such as gyroscopes which measure rates of change in angular displacement because the optical movement sensor will often be fixedly mounted to the vehicle such that the orientation of the optical movement sensor is fixed to, and changes with, the orientation of the vehicle.

The single optical movement sensor of the kind used in optical computer mice is able to detect and measure movement of the optical movement sensor along the X (roll) and Y (pitch) axes (in the present context this means the X (roll) and Y (pitch) axes of the vehicle because the optical movement sensor is fixed to the vehicle). However, this kind of optical movement sensor is not generally able to detect and measure rotation about the Z (yaw) axis. Consequently, if it is desired to compensate for the XYZ errors in inertial sensors such as gyroscopes using optical movement sensors that are fixedly mounted to the vehicle, two or more optical movement sensors will generally need to be provided and mounted at different locations on the vehicle.

Alternatively, a single optical movement sensor can be used to compensate for the errors in gyroscopes and the like which measure rates of change in rotational displacement if the optical movement sensor is not fixed with respect to the vehicle. Rather, the optical movement sensor could be mounted so that when the vehicle turned (i.e. rotated about its Z (yaw) axis), the orientation of the optical movement sensor would remain unchanged. In effect, even if the vehicle turns, the orientation of the optical movement sensor would remain unchanged meaning that the optical movement sensor would effectively translate but not rotate with respect to the surface over which the vehicle is moving. A single optical movement sensor might thus be used to compensate for the errors in both accelerometers and gyroscopes, but some system or mechanism (e.g., gimbal-mounting) would need to be provided to maintain the constant orientation of the optical movement sensor.

The embodiments of the invention described above where the control system incorporates one or more inertial sensors, one or more optical movement sensors, and where the optical movement sensor(s) are used (instead of GNSS signals) to compensate for the errors in the inertial sensor(s) can generally be described as relative measurement control systems. This is because the optical movement sensor(s) and the inertial sensor(s) can only measure changes in vehicle attitude and/or position. They are unable to fix the geographic position and attitude of the vehicle in absolute "global" coordinates. References in this document to relative movement of the vehicle, or of an implement associated with the vehicle, or relative attitude/position/heading/pose information should be understood in this context.

However, the relative coordinate system established by relative measurement control systems such as those described above can relate to absolute geographic space if the vehicle can be moved sequentially to at least two, and preferably three or more, locations whose absolute geographic locations are known. This leads to the possibility of calibrating a control system having only optical, inertial, and possibly other vehicle sensors, in the total absence of GNSS. For example, during power up (initialization), the inertial navigation system positions of the vehicle could be arbitrarily set on a map whose origin and orientation is known. To relate this map to absolute geographic space, the vehicle could be located at the first known location, the internal coordinates noted, then moved to a second location and the new internal coordinates likewise noted. The line between the two points could be fitted from the internal map onto the real world map to arrive at the XY offset between the two map origins, the orientation difference between the two map origins, and the linear scaling difference between the two maps.

Thus, in one embodiment, the present invention may comprise a control system including one or more optical movement sensors and one or more inertial sensors. Suitably, the control system may include one or more optical movement sensors and an assembly of inertial sensors. In one embodiment, the control system of the present invention may further comprise an assembly of sensors including accelerometers and rate gyroscopes for providing further position and/or attitude signals to the controller. The assembly may comprise between one and three sensor sets orthogonally mounted, with each sensor set comprising not necessarily one of each, but no more than one of each of the above-mentioned sensors. Such inertial sensors are well known to persons skilled in the art and need not be described further.

In another embodiment, the present invention may comprise a control system including one or more optical movement sensors and one or more other sensors. The other sensors may comprise navigation sensors such as magnetometers, or vehicle sensors such as wheel speed encoders, and steering angle encoders. Control systems in accordance with this embodiment of the invention would also be described as relative measurement control systems, and the relative coordinate system established by such a system can relate to absolute geographic space in generally the same way as described above.

In yet another embodiment, the control system of the present invention, which incorporates one or more optical movement sensors, may be integrated with a GNSS system. In this system, the GNSS system provides absolute measurement in geographic space and the optical movement sensor provides relative movement data that can be used to control the vehicle during periods of outage of GNSS signals or during periods of normal operation when no GNSS signals are being received. Thus, in a further embodiment, the present invention provides a control system including one or more optical movement sensors and a GNSS system.

In a further still embodiment, the control system of the present invention may incorporate one or more optical movement sensors, a GNSS system and one or more inertial sensors, suitably an assembly of inertial sensors. In this embodiment, the optical movement sensor is configured to look at the ground near or under the vehicle. The output signal generated by the optical movement sensor comprises the relative movement along the axis of the vehicle and the relative movement across the axis of the vehicle. This information can be used as an additional source for compensating for the errors in the inertial sensors, giving a combined GNSS/INS/optical movement sensor system with the capability of operating over sustained periods of GNSS outage. Thus, in another embodiment, the present invention that may provide a control system including one or more optical movement sensors, a GNSS system and one or more inertial sensors, such as an assembly of inertial sensors.

GPS (global positioning system) is the name of the satellite-based navigation system originally developed by the United States Department of Defense. GNSS (including GPS and other satellite-based navigation systems) is now used in a wide range of applications. A number of systems also exist for increasing the accuracy of the location readings obtained using GNSS receivers. Some of these systems operate by taking supplementary readings from additional satellites and using these supplementary readings to "correct" the original GNSS location readings. These systems are commonly referred to as "Satellite Based Augmentation Systems" (SBAS) and some examples of SBASs are:

- The United States' "Wide Area Augmentation System" (WAAS),
- The European Space Agency's "European Geostationary Navigation Overlay Service" (EGNOS), and
- The Japanese "Multi-Functional Transportation Satellite" (MFTS)

A number of "Ground Based Augmentation Systems" (GBASs) also exist which help to increase the accuracy of GNSS location readings by taking additional readings from beacons located at known locations on the ground. It will be understood that throughout this specification, all references to GNSS include GNSS when augmented by supplementary systems such as SBASs, GBASs and the like.

In embodiments of the present invention where the optical movement sensor is used in combination with one or more other sensors, the datastream from the optical movement sensor may be combined with a datastream from another sensor. This may be done using known signal processing techniques to obtain a stream of statistically optimal estimates of the vehicle's current position and/or attitude. Suitably, the signal processing techniques may utilize a statistically optimised filter or estimator. The optimal filter or estimator could usefully, but not necessarily, comprise a Kalman filter.

The optical sensor used in the control system in accordance with the present invention may comprise an optical movement sensing integrated circuit that receives raw data from a lens assembly mounted on a vehicle or on an implement towed by a vehicle. The lens assembly may be configured such that an image of the ground immediately below the lens assembly is formed on a photosensor plane of the optical movement sensing integrated chip by the lens assembly. Usefully, the lens may be a telecentric lens. Furthermore, the lens may be an object space telecentric lens. An object space telecentric lens is one that achieves dimensional and geometric invariance of images within a range of different distances from the lens and across the whole field of view. Telecentric lenses will be known to those skilled in the art and therefore need not be described any further.

The lens assembly may be chosen so that the extent of the image on the optical movement sensing integrated chip represents a physical extent in the object plane which is commensurate with both the anticipated maximum speed of the vehicle and the processing rate of the optical movement sensing integrated circuit. For example, if the maximum speed of the vehicle is 5 m per second and the desired overlap of successive images is 99%, an image representing 0.5 m in extent will require a processing speed of 1000 frames per second.

The optical movement sensor may include an illumination source of sufficient power such that the image of the ground beneath the vehicle is rendered with optimum contrast. This can be usefully, but not necessarily implemented as an array of high intensity light emitting diodes chosen to emit light at the wavelength of optimal intensity of the optical movement sensor.

Desirably, the optical movement sensor may be provided with a mechanism to keep the entrance pupil of the optical assembly free of dust. This could be usefully implemented by means of a high velocity air curtain passing the entrance pupil. Other mechanisms may be used, such as those that spray a cleaning fluid over the pupil. The cleaning fluid in those embodiments may comprise a cleaning liquid, such as water. Other means or mechanisms suitable for keeping the lens, or at least the entrance pupil of the optical assembly, free of dust will be known to those skilled in the art and may also be used with the present invention.

In another embodiment, the present invention provides a control system for controlling a position of an implement associated with a vehicle, characterised in that the control system includes an optical movement sensor which scans a surface over which the implement is moving and generates a signal indicative of relative movement along an axis of the implement and relative movement across an axis of the implement, said signal being provided to a controller.

In another aspect, the present invention provides a control system for maintaining a position and/or heading (attitude) of an implement close to a desired path of travel, the control system comprising a controller having a computer memory for storing or generating the desired path of travel, the controller being adapted to receive position and/or heading signals relating to a position and/or heading of the implement from one or more sensors, the position and/or heading signals enabling the controller to determine the position and/or heading of the implement relative to the desired path of travel, the controller sending control signals to a position and/or heading control mechanism in response to the determined position and/or heading, wherein the position and/or heading signals from the one or more sensors include a signal generated by an optical movement sensor configured to scan a surface over which the implement is travelling, the optical movement sensor generating a signal indicative of relative movement along an axis of the vehicle and relative movement across an axis of the vehicle. Suitably, in this aspect, the optical movement sensor is mounted to the implement. The optical movement sensor may scan the surface close to the implement or underneath the implement as the implement traverses the surface.

In this aspect, the control algorithms and the position control mechanisms may be as described in U.S. Pat. No. 7,460,942, which is assigned to a common assignee herewith and incorporated herein by reference. In embodiments of this aspect of the invention, the position of the implement may be controlled by controlling the steering of the vehicle associated with the implement (this is especially useful if the implement is rigidly and fixedly connected to the vehicle), or by moving the position of the implement (or at least a working part of the implement) relative to the vehicle, which may be achieved by adjusting the lateral offset between the working part of the implement and the vehicle, or by using the working part of the implement to "steer" the implement.

In this aspect, the control system may further include one more of a GNSS system and inertial sensors and navigation sensors and vehicle based sensors. These various systems and sensors are described above with reference to other aspects of the invention.

BRIEF DESCRIPTION OF THE DRAWINGS

Certain embodiments, aspects and features of the invention will now be described and explained by way of example and with reference to the drawings. However, it will be clearly appreciated that these descriptions and examples are provided to assist in understanding the invention only, and the invention is not necessarily limited to or by any of the embodiments, aspects or features described or exemplified.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Global navigation satellite systems (GNSS) are broadly defined to include GNSS (U.S.), Galileo (proposed), GLONASS (Russia), Beidou (China), Compass (proposed), IRNSS (India, proposed), QZSS (Japan, proposed) and other current and future positioning technology using signals from satellites, using single or multiple antennae, with or without augmentation from terrestrial sources. Inertial navigation systems (INS) include gyroscopic (gyro) sensors, accelerometers and similar technologies for providing output corresponding to the inertia of moving components in all axes, i.e. through six degrees of freedom (positive and negative directions along longitudinal X, transverse Y and vertical Z axes). Yaw, pitch and roll refer to moving component rotation about the Z, Y and X axes respectively. Said terminology will include the words specifically mentioned, derivatives thereof and words of similar meaning.

Figure 1A:
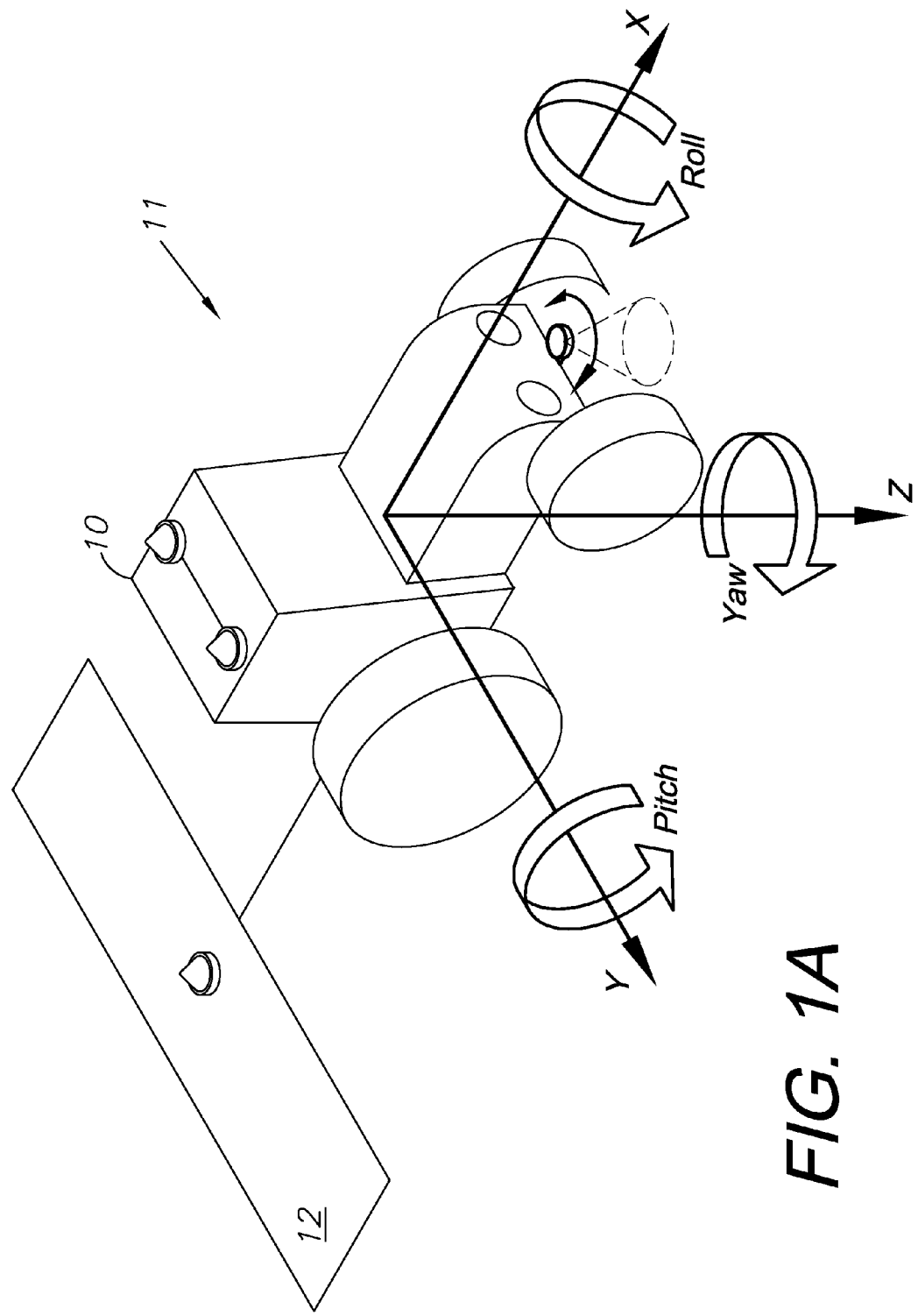
FIG. 1A shows a vehicle comprising a tractor and an implement fitted with an optical tracking control system in accordance with one embodiment of the present invention, and further shows XYZ axial attitude orientations.
Figure 1B:
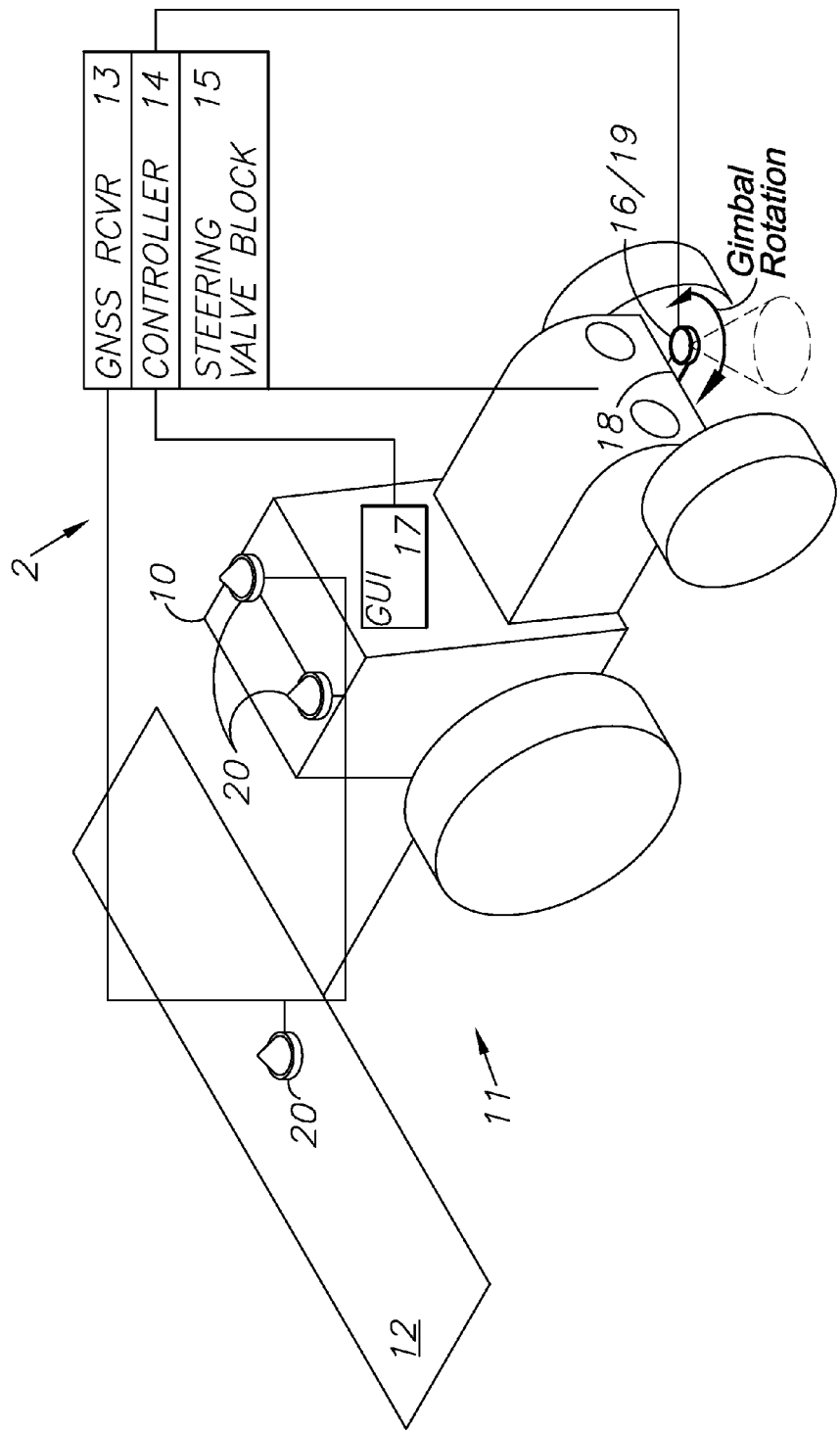
FIG. 1B shows the vehicle with a block diagram of the control system.

FIGS. 1A and 1B show a vehicle 11 fitted with an optical tracking control system 2 including an optical movement sensor 16 in accordance with an embodiment of the present invention. The vehicle 11 includes a tractor 10 towing an agricultural implement 12, such as a plough, a sprayer, a grain drill, a cultivator, etc. Without limitation and by way of example only, the control system 2 is shown in connection with a tractor 10 and an implement 12, which collectively comprise the vehicle 11. The control system 2 is equally adaptable for use with various other vehicles, such as self-propelled sprayers, combines, multiple-component articulated vehicles and over-the-road vehicles.

The control system 2 includes a controller 14. The controller 14 suitably includes a computer memory that is capable of having an initial path of travel entered therein. The computer memory is also adapted to store or generate a desired path of travel. The controller 14 receives position and attitude signals from one or more sensors (to be described later) and the data received from the sensors are used by the controller to determine or calculate the position and attitude of the tractor. The controller 14 then compares the position and attitude of the tractor 10 with the desired position and attitude. If the determined or calculated position and attitude of the tractor deviates from the desired position and attitude, the controller 14 issues a steering correction signal that interacts with a steering control mechanism, e.g., a steering valve block 15. In response to the steering correction signal, the steering control mechanism makes adjustments to the angle of steering of the tractor 10, to thereby assist in moving the tractor back towards the desired path of travel. The steering control mechanism 15 may comprise one or more mechanical or electrical controllers or devices that can automatically adjust the steering angle of the vehicle. These devices may act upon the steering pump, the steering column and/or steering linkages. U.S. Pat. No. 6,711,501, which is incorporated herein by reference, shows a GNSS-based navigation system including a graphical user interface (GUI) for use by an operator in guiding a vehicle in swathing operations.

In one embodiment of the present invention, the steering control algorithm may be similar to that described U.S. Pat. No. 6,876,920, which is incorporated herein by reference and discloses a steering control algorithm, which involves entering an initial path of travel (often referred to as a wayline). GNSS ranging signals can be received at antennas 20 mounted on the tractor 10 and the implement 12 and connected to a GNSS receiver 13, which in turn provides positioning information, typically in an absolute or relative geo-reference frame, to the controller 14. The computer in the controller 14 then determines or calculates the desired path of travel, for example, by determining the offset of the implement 12 being towed by the tractor 10 and generating a series of parallel paths spaced apart from each other by the offset of the implement 12. This ensures that an optimal working of the field is obtained. The vehicle then commences moving along the desired path of travel. One or more sensors provide position and attitude signals to the controller 14, which uses these position and attitude signals to determine or calculate the position and attitude of the vehicle 11. This position and attitude is then compared with the desired position and attitude. If the vehicle 11 is spaced away from the desired path of travel, or is pointing away from the desired path, the controller 14 generates a steering correction signal. The steering correction signal may be generated, for example, by using the difference between the determined position and attitude of the vehicle 11 and the desired position and attitude to generate an error signal, with the magnitude of the error signal being dependent upon the difference between the determined position and attitude and the desired position and attitude of the vehicle 11. The error signal may take the form of a curvature demand signal that acts to steer the vehicle 11 back onto the desired path of travel. Steering angle sensors in the steering control mechanism, which includes a steering valve block 15, can monitor the angle of the steering wheels of the tractor 10 and send the data back to the controller 14 to thereby allow for understeering or oversteering.

In an alternative embodiment, the error signal may result in generation of a steering guidance arrow on a visual display unit to thereby enable the driver of the vehicle to properly steer the vehicle back onto the desired path of travel. For example, see U.S. Pat. No. 6,711,501. This manual control indicator may also be provided in conjunction with the steering controls 15 as described above.

It will be appreciated that the invention is by no means limited to the particular algorithm described, and that a wide variety of other steering control algorithms may also be used.

In general terms, most, if not all, steering control algorithms operate by comparing a determined or calculated position and attitude of the vehicle with a desired position and attitude of the vehicle. The desired position and attitude of the vehicle is typically determined from the path of travel that is entered into, or stored in, or generated by, the controller. The determined or calculated position and attitude of the vehicle is, in most, if not all, cases determined by having input data from one or more sensors being used to determine or calculate the position and attitude of the vehicle. In U.S. Pat. No. 6,876,920, which is incorporated herein by reference, GNSS sensors, accelerometers, wheel angle sensors and gyroscopes are used as the sensors in preferred embodiments of that patent.

Returning now to FIGS. 1A and 1B, the tractor 10 is fitted with a controller 14. The controller 14 includes a graphic user interface (GUI) 17 mounted in the cab of the tractor 10 for inputting data to the controller 14 and displaying output therefrom. The GUI 17 can comprise any means for entering data into the controller 14, for example a touchscreen, keyboard or keypad for manually entering data, or a cable/wireless connection for transferring data to the controller 14. The GUI 17 also includes a display screen, and can include various other output devices such as LEDs, audio, printers, hardwired and wireless output connections, etc. The controller 14 also includes a computer memory for receiving and storing data, a CPU for processing data and a control signal generator for generating control signals to the steering control mechanism. The controller may also include random access memory (RAM), read only memory (ROM), and an optical disc drive such as a DVD drive or a CD drive for receiving optical disks and reading information therefrom. The controller may be pre-programmed with software that allows for calculation of the desired path of travel. Alternatively, software may be loaded onto the controller from a recorded media carrier, such as a DVD disc, a CD disc, a floppy disk or the like. Appropriate software may be downloaded from a network. The actual details of the controller will be readily understood by persons skilled in the art and need not be described further.

Figure 9:
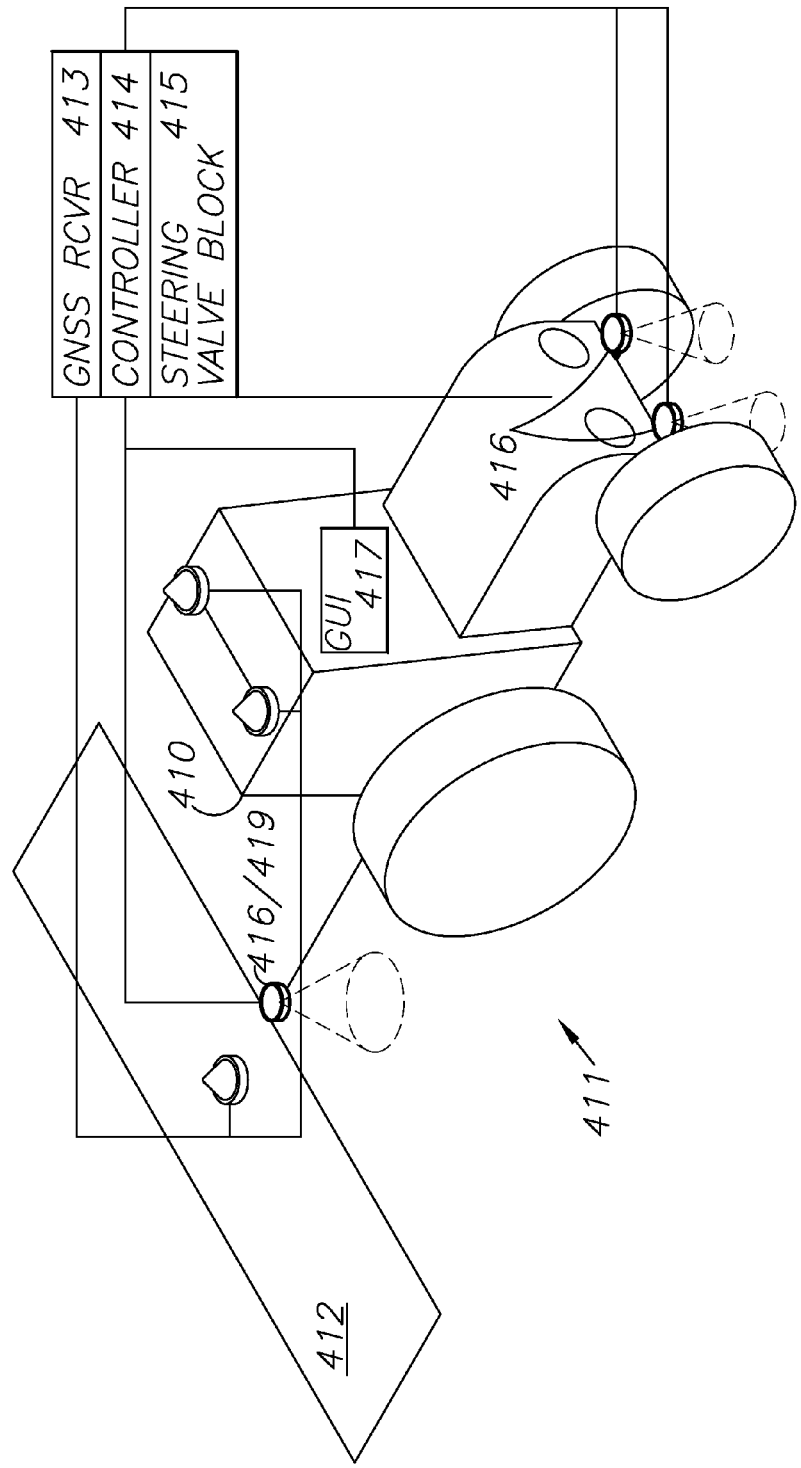
FIG. 9 shows a schematic view of an embodiment of the present invention in which the position of an implement is optically tracked.

The tractor 10 shown in FIGS. 1A and 1B is also fitted with an optical movement sensor 16. The optical movement sensor 16 is fitted to an arm 18 extending forwardly from the front of the tractor 10. This is so that the optical movement sensor 16 is ahead of the wheels to minimize the effect of dust kicked up by the wheels. However, it will be appreciated that the optical movement sensor 16 may be positioned at a side or at a rear part of the tractor 10, or even underneath it. The basic requirement for the optical movement sensor 16 positioning and mounting is that the optical movement sensor can emit radiation, typically light, onto the ground or other travel surface and receive reflected radiation or light from the ground. Provided that this basic requirement is met, the optical movement sensor may be mounted anywhere on the tractor. An optical movement sensor may also be mounted on the implement 12 (FIG. 9).

In the embodiment shown in FIGS. 1A and 1B, the optical movement sensor 16 is "gimballed", meaning that its orientation with respect to the tractor may change. This "gimballed" embodiment is described further below.

The optical tracking movement sensor 16 may comprise the operative part of an optical computer mouse. Optical computer mice incorporate an optoelectronics sensor that takes successive pictures of the surface on which the mouse operates. Most optical computer mice use a light source to illuminate the surface that is being tracked. Changes between one frame and the next are processed by an image processing part of a chip embedded in the mouse and this translates the movement of the mouse into movement on two axes using a digital correlation algorithm. The optical movement sensor 16 may include an illumination source for emitting light therefrom. The illumination source may comprise one or more LEDs. The optical movement sensor may also include an illumination detector for detecting light reflected from the ground or the surface over which the vehicle is travelling. Appropriate optical components, such as a lens (preferably a telecentric lens), may be utilized to properly focus the emitted or detected light. A cleaning system, such as a stream of air or other cleaning fluid, may be used to keep the optical path clean. The optical movement sensor may comprise a charge coupled device (CCD) or a complimentary metal oxide semiconductor (CMOS) sensor. The optical movement sensor 16 may also include an integrated chip that can rapidly determine the relative movement along an axis of the vehicle and the relative movement across an axis of the vehicle by analysing successive frames captured by the illumination detector. The optical movement sensor can complete hundreds to thousands of calculations per second.

The optical movement sensor 16 generates signals that are indicative of the relative movement of the vehicle along the vehicle's axis and the relative movement of the vehicle across the vehicle's axis. The signals are sent to the controller 14. The signals received by the controller 14 are used to progressively calculate or determine changes in the position and attitude of the vehicle. In the embodiment shown in FIGS. 1A and 1B, the controller 14 may include a clock that can be used to determine a time of travel of the vehicle and use that time of travel and possibly other input variables (such as the speed of the vehicle), together with the signals generated by the optical movement sensor, to calculate or determine the position and attitude of the vehicle This may then be compared to the desired position and attitude of the vehicle arising from the desired path of travel stored in or generated by the controller. If there are any discrepancies between the calculated or determined position and attitude of the vehicle and the desired position and attitude of the vehicle, a steering correction signal is sent from the controller 14 to the steering (valve block) control mechanism. Examples of such automatic steering control mechanisms are disclosed in U.S. Pat. Nos. 7,142,956; 7,277,792; 7,400,956; and 7,437,230, all of which are assigned to a common assignee with the present application and are incorporated herein by reference.

Only one optical movement sensor 16 is illustrated in FIGS. 1A and 1B. However, as described above, if the optical movement sensor 16 is the kind used in optical computer mice, and if the optical movement sensor 16 is fixed with respect to the vehicle, the optical movement sensor will generally only measure movement along and across the principal axis of the vehicle (i.e. along the longitudinal roll X axis and along the transverse pitch Y axis). Fixed optical movement sensors of this kind generally do not measure rotation about the yaw Z axis. A single optical movement sensor 16 could be used to measure change in the vehicle's orientation with respect to its yaw Z axis (in addition to measuring changes in the movement of the vehicle along the roll X and pitch Y axes), if the optical movement sensor 16 is mounted in a gimbal mount 19, which can be controlled with input from a compass (GNSS, magnetic, etc.) and/or a gyroscope. In this context, "gimballed" means that the optical movement sensor 16 is mounted to the vehicle in a dynamically pivotable manner so that the orientation of the optical movement sensor (at least about its yaw Z axis) remains the same even if the orientation of the vehicle about its yaw Z axis changes. In other words, so that the optical movement sensor orients itself in a similar way to a compass needle (which stays in one orientation even if the compass is rotated). It will be appreciated from the explanations given above that if a single optical movement sensor is mounted to the vehicle in "gimballed" manner, the optical movement sensor will effectively translate, but not rotate, as the vehicle moves and turns. In order to achieve "gimballed" mounting, a gimbal device or mechanism 19 is provided to dynamically adjust the orientation of the optical movement sensor with respect to the vehicle so that the optical movement sensor's orientation remains the same as the vehicle moves and turns. Such gimbal mounting devices and mechanisms are commercially available and will be known to those skilled in the art. They therefore require no further explanation. The gimballed mounting device or mechanism could also monitor the change in the optical movement sensor's orientation relative to the orientation of the vehicle, and this information could be used to calculate or determine changes in the vehicle's orientation about its yaw Z axis.

Figure 1C:
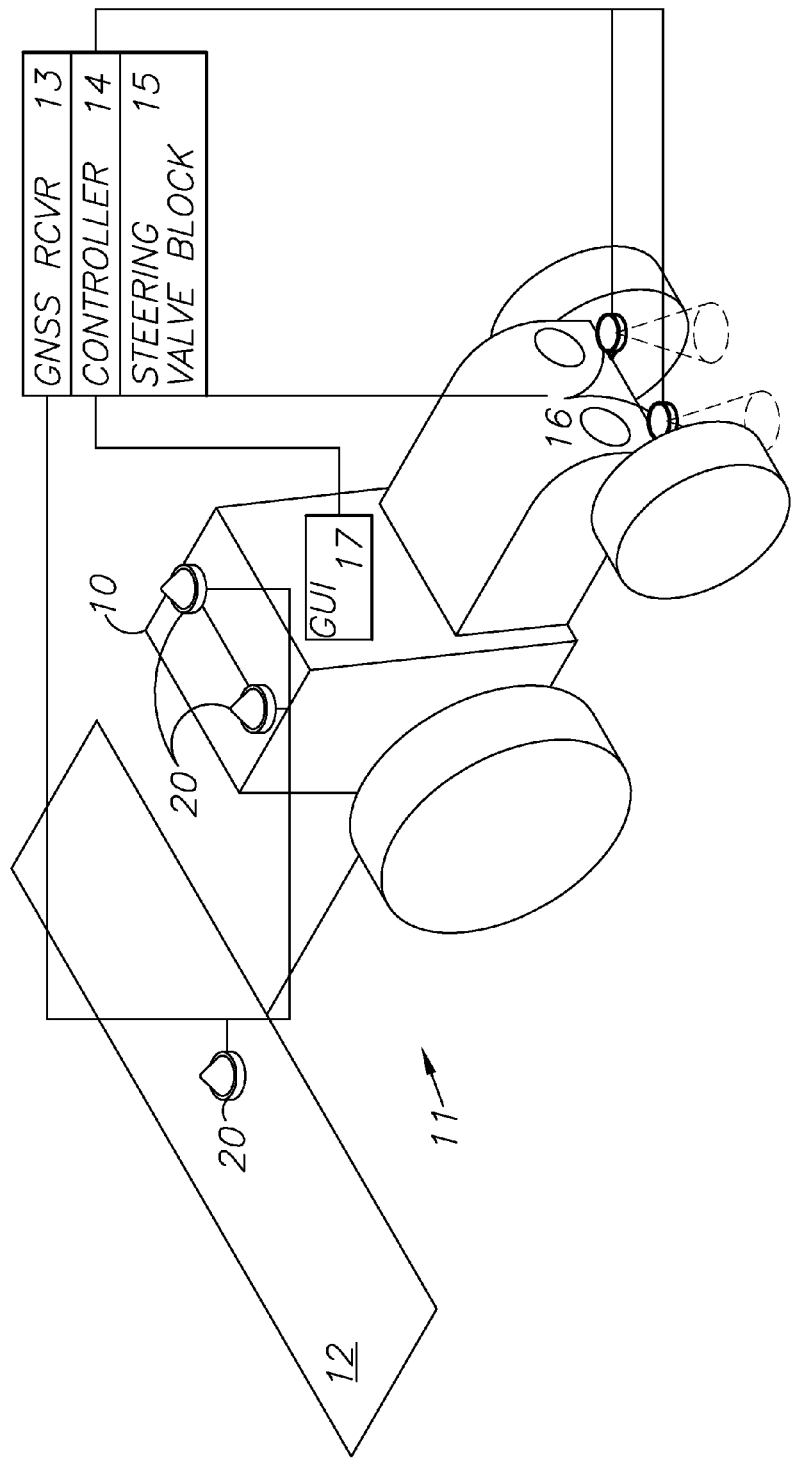
FIG. 1C shows a vehicle fitted with an optical tracking control system in accordance with another embodiment of the present invention including a pair of optical tracking sensors.

FIG. 1C shows a two-sensor alternative embodiment system, which accommodates calculating and determining attitude changes in the vehicle's orientation about its yaw Z axis. The attitude changes indicate the vehicle's heading or direction of travel. Two optical computer mouse type sensors 16 are mounted on the front of the tractor 10 and each measures movement of the tractor 10 along the longitudinal roll X axis and along the transverse pitch Y axis (FIG. 1A). However, where the longitudinal and transverse movements detected by each optical movement sensor 16 differ, this difference will generally be associated with changes in the vehicle's orientation about its yaw Z axis. Therefore, this difference may be used to calculate or determine changes in the vehicle's orientation about its yaw Z axis. As an example, the vehicle 11 might be provided with a pair of optical movement sensors 16 each located adjacent to and inboard of a respective front wheel (FIG. 1C). Therefore, there would be one optical movement sensor 16 on either side at the front of the vehicle 11. If the vehicle were to turn (which would make it rotate about its yaw Z axis), the optical movement sensor 16 on the outside of the turning circle would measure a greater distance travelled than the optical movement sensor on the inside. This difference could then be used, along with the known positioning of each optical movement sensor with respect to the other, to calculate or determine the change in the vehicle's orientation about its yaw Z axis.

Figure 2:
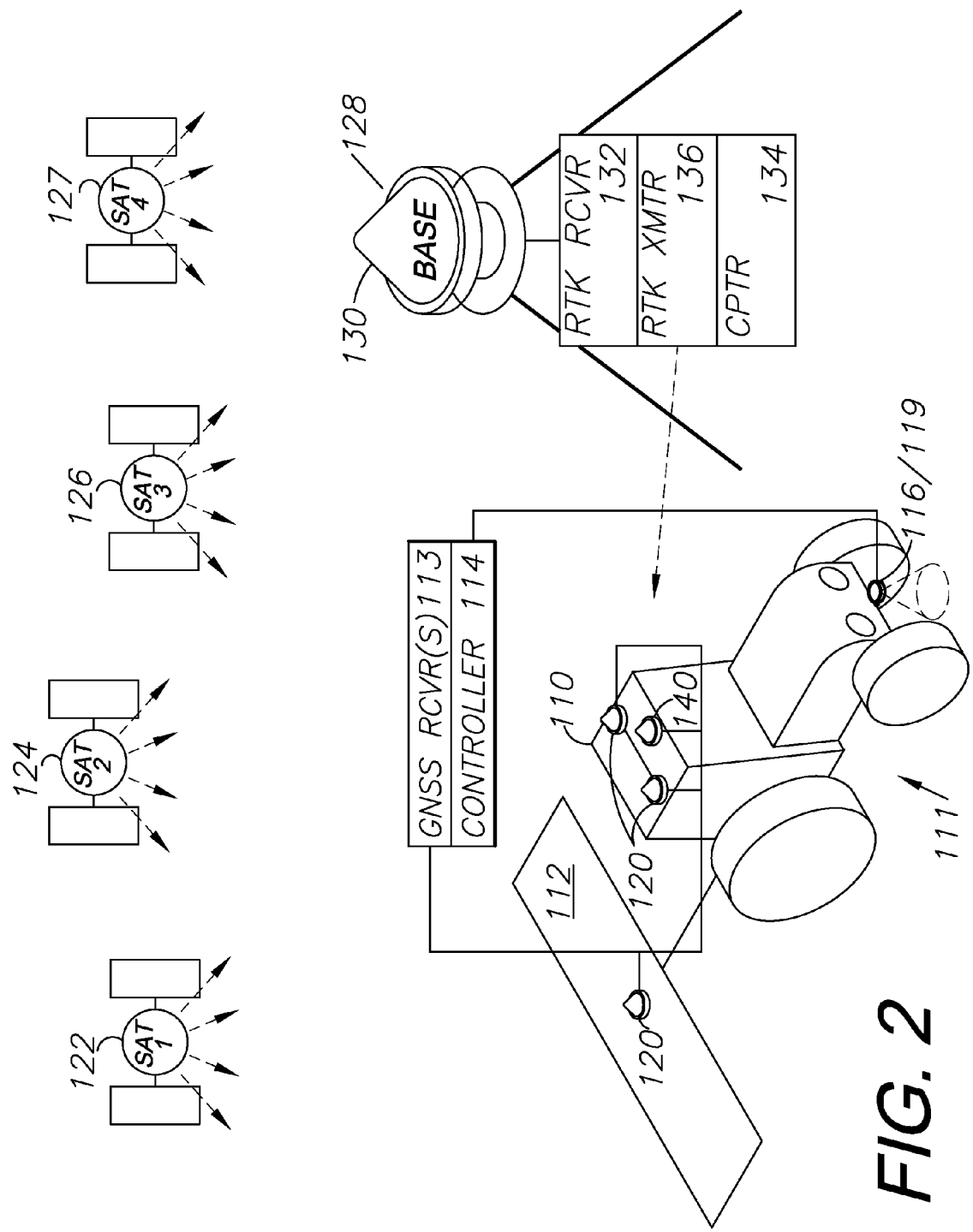
FIG. 2 shows a real-time kinematic (RTK) optical tracking vehicle control system in accordance with another embodiment of the present invention.

FIG. 2 shows a schematic diagram of an alternative embodiment of the present invention. A number of the features of the embodiment shown in FIG. 2 are similar to those shown in FIG. 1. For convenience and brevity of description, similar features in FIG. 2 are denoted by the same reference numeral as those used to denote similar features in FIG. 1, but increased by 100. For example, tractor 110 in FIG. 2 corresponds to tractor 10 in FIG. 1. It can be seen that the embodiment shown in FIG. 2 also includes a controller 114 and an optical movement sensor 116 mounted on a gimbal 119.

The embodiment shown in FIG. 2 further includes a differential GNSS system. The differential GNSS system includes a GNSS receiver(s) 113 connected to satellite antennas 120. The satellite antennas 120 are mounted on the roof of the tractor 110 and optionally on the implement 112. Such multiple antennas 120 enable vector calculations of the tractor attitude. The satellite antennas 120 receive satellite signals from the array of GNSS satellites orbiting the earth, shown schematically at 122, 124, 126 and 127. The differential GNSS system also includes a base station 128. The base station 128 includes a GNSS antenna 130 connected to a GNSS receiver 132. The antenna 130 receives signals from the orbiting GNSS satellites 122, 124, 126 and 127. The GNSS receiver 132, on the basis of the signals coming from antenna 130, calculates and provides positional data to a computer 134. The computer compares the positional data from the GNSS receiver 132 with a predetermined and accurately known position for antenna 130. On the basis of this comparison, computer 134 is able to calculate an error factor, which is continuously updated and passed to a transmitter 136, such as a radio modem. The transmitter 136 generates a serial data signal which is upconverted and propagated by the base antenna 130. The transmitted error signal is received by an antenna 140 mounted on tractor 110.

The GNSS receiver(s) 113 on the tractor 110 receives GNSS signals from the constellation of GNSS satellites via GNSS antenna 120 mounted on the tractor 110. The signals are sent to the controller 114. The signals received from GNSS receiver(s) 113 on tractor 110 are corrected by the error correction signal sent from the transmitter 136. Thus, an accurate determination of position of the tractor 110 can be obtained from the differential GNSS system. The differential GNSS positioning system thus described can comprise a real-time kinematic (RTK) system using the carrier phase of the satellite ranging signals with the rover receiver(s) 113 in motion on the vehicle 111. RTK systems tend to be relatively accurate, and are capable of achieving sub-centimeter precision guidance.

The controller 114 also receives position signals from the optical movement sensor 116. As described above with reference to the embodiment in FIGS. 1A and 1B, if the optical movement sensor 116 in FIG. 2 is the kind used in optical computer mice, and if it is fixed to the vehicle, two or more such fixed optical movement sensors would need to be provided if the optical movement sensor is to be used to measure changes in the vehicle's orientation about its yaw axis. Alternatively, a single optical movement sensor might be used, provided the single optical movement sensor is mounted in a gimballed manner and the device or mechanism used for the gimballed mounting can monitor the changes in the orientation of the optical movement sensor relative to the orientation of the vehicle. Further explanation of the embodiment in FIG. 2 will be provided below.

Figure 3:
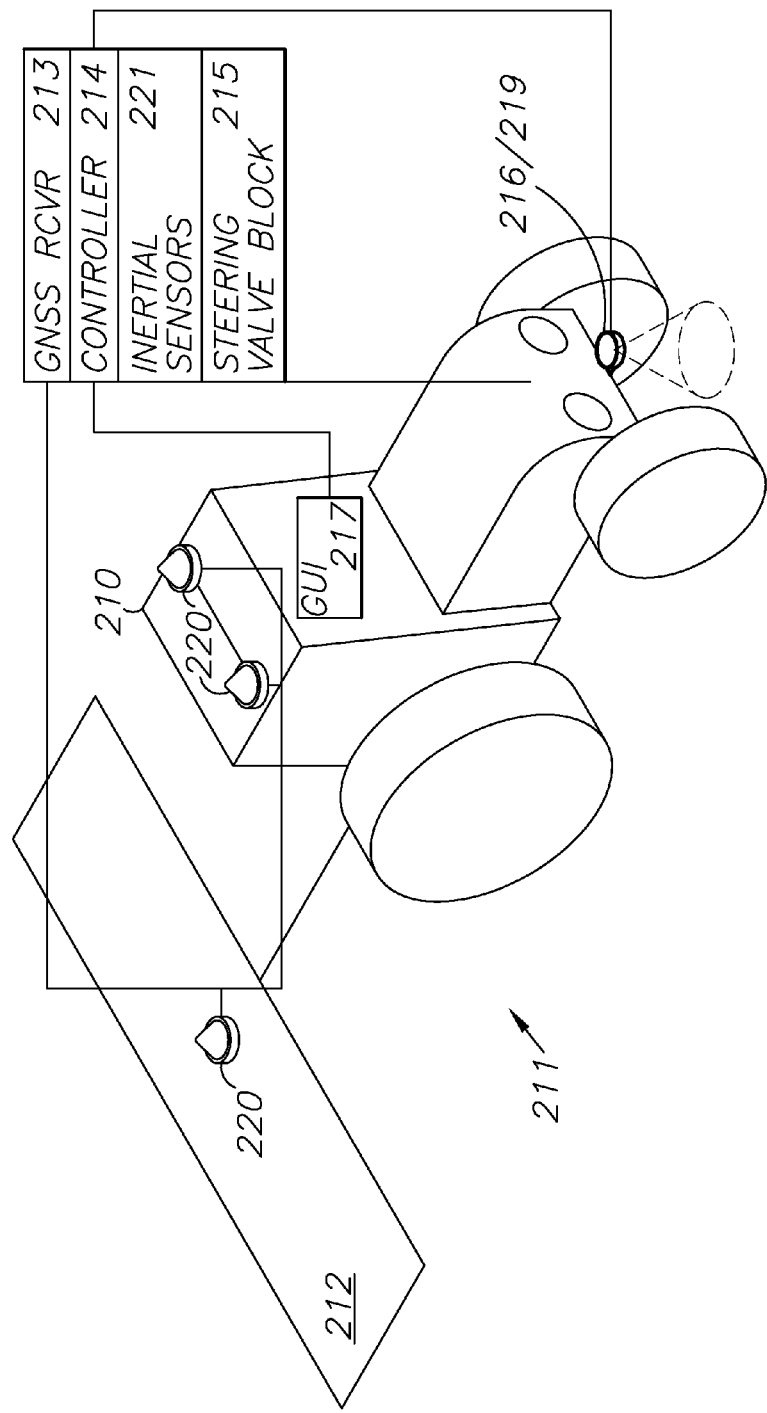
FIG. 3 shows a vehicle fitted with an optical tracking control system in accordance with another embodiment of the present invention including an inertial navigation system (INS) with inertial sensors.

FIG. 3 shows a schematic diagram of an alternative embodiment of the present invention. A number of the features of the embodiment shown in FIG. 3 are similar to those shown in FIG. 1. For convenience and brevity of description, similar features in FIG. 3 are denoted by the same reference numeral as used to denote those features in FIG. 1, but increased by 200. For example, tractor 210 in FIG. 3 corresponds to tractor 10 in FIG. 1, which is connected to an implement 212 to collectively form a vehicle 211. It can be seen that the embodiment shown in FIG. 2 also includes a GNSS receiver 213 connected to antennas 220 and to a controller 214, which is also connected to a steering valve block 215 and to a GUI 217. An optical movement sensor 216 is mounted on a gimbal mount 219 enabling monitoring changes in the orientation of the optical movement sensor 216 relative to the orientation of the vehicle 211, as described above.

The embodiment shown in FIG. 3 also includes one more inertial sensors 221 mounted on the tractor 210. The one more inertial sensors 221 may comprise one or more accelerometers and/or gyroscopes. Instead of the inertial sensors, one or more vehicle based sensors may be used. These may include magnetometers, wheel angle sensors and/or wheel speed encoders. A combination of inertial sensors and vehicle-based sensors may also be used. An assembly of sensors, such as an Inertial Navigation System (INS), a Dynamic Measurement Unit (DMU), an Inertial Sensor Assembly (ISA), a Vertical Gyro (VG) or an Attitude Heading Reference System (AHRS) may be used. The inertial sensors 221 may comprise one or more, or an assembly of sensors including accelerometers and rate gyroscopes for providing further position and attitude signals to the controller. Preferably (although not necessarily), the assembly may comprise between one and three sensor sets orthogonally mounted, with each sensor set comprising at least one of each of the above mentioned sensors.

The inertial sensors 221 provide relative position and attitude information to the controller 214. Similarly, the optical movement sensor 216 also provides relative position and attitude information to controller 214. The controller 214 uses both sets of information to obtain a more accurate determination of the position and attitude of the vehicle. This will be described in greater detail hereunder. Also, as described above with reference to the embodiments in FIGS. 1A, 1B, 1C and 2, if the optical movement sensor 116 in FIG. 3 is the kind used in optical computer mice, and if it is fixed to the vehicle, either gimbal mounting or two or more such fixed optical movement sensors would need to be provided if the optical movement sensor is to be used to measure changes in the vehicle's orientation about its yaw Z axis.

Figure 4:
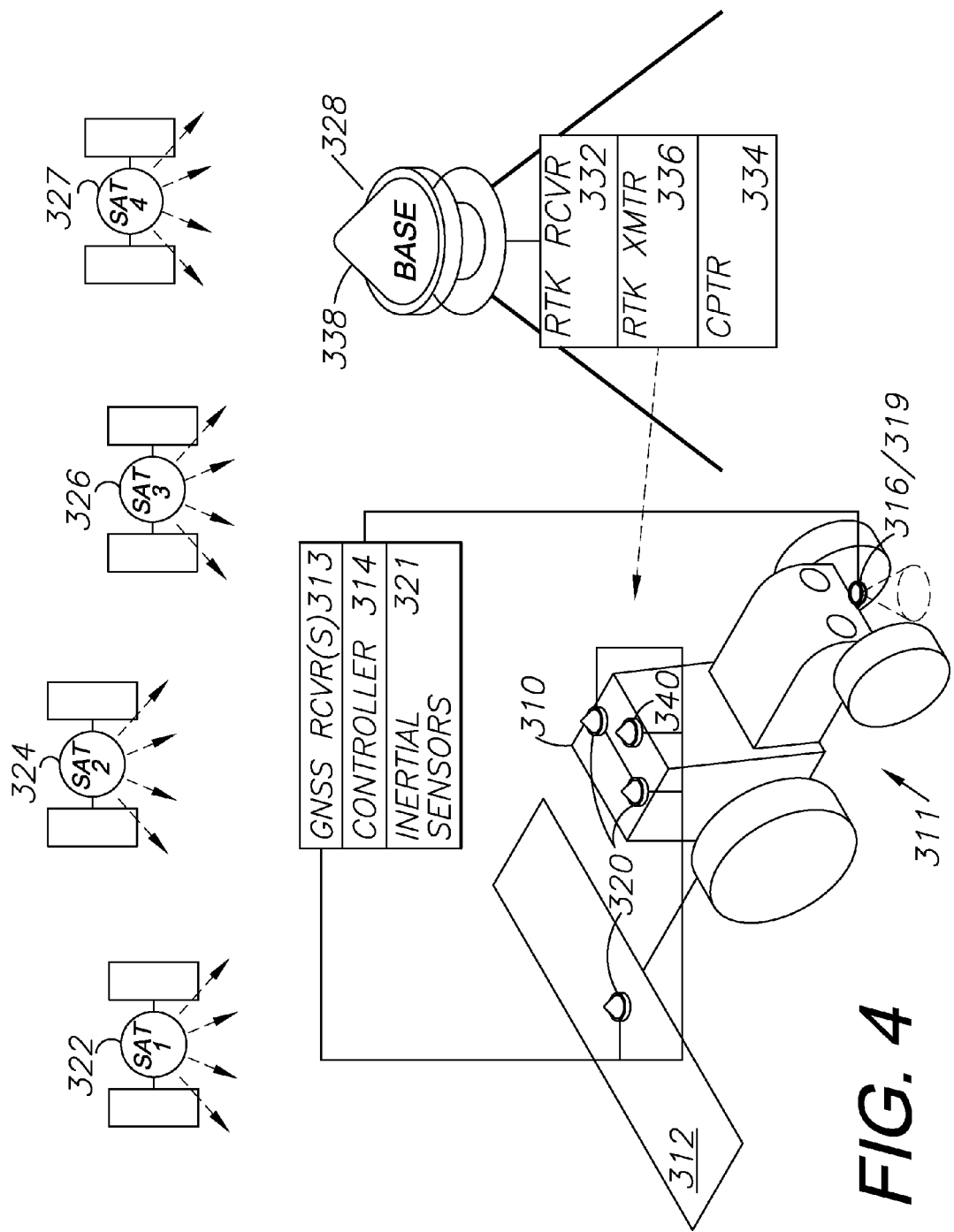
FIG. 4 shows an RTK optical tracking vehicle control system in accordance with another embodiment of the present invention including an INS.

FIG. 4 shows a schematic view of a further embodiment of the present invention. A number of the features of the embodiment shown in FIG. 4 are similar to those shown in FIG. 2. For convenience and brevity of description, similar features in FIG. 4 are denoted by the same reference numerals used to denote those features in FIG. 2, but with the leading "1" of the reference numerals used in FIG. 2 replaced with a leading "3" in FIG. 4 (i.e., plus 200). For example, tractor 310 in FIG. 4 corresponds to tractor 110 in FIG. 2.

The embodiment shown in FIG. 4 includes an optical movement sensor 316 mounted on a gimbal mount 319, a GNSS receiver(s) 313, antennas 320 and an inertial sensor(s) 321. These sensors interact with a controller 314 in a manner that will be described hereunder.

Figure 5:
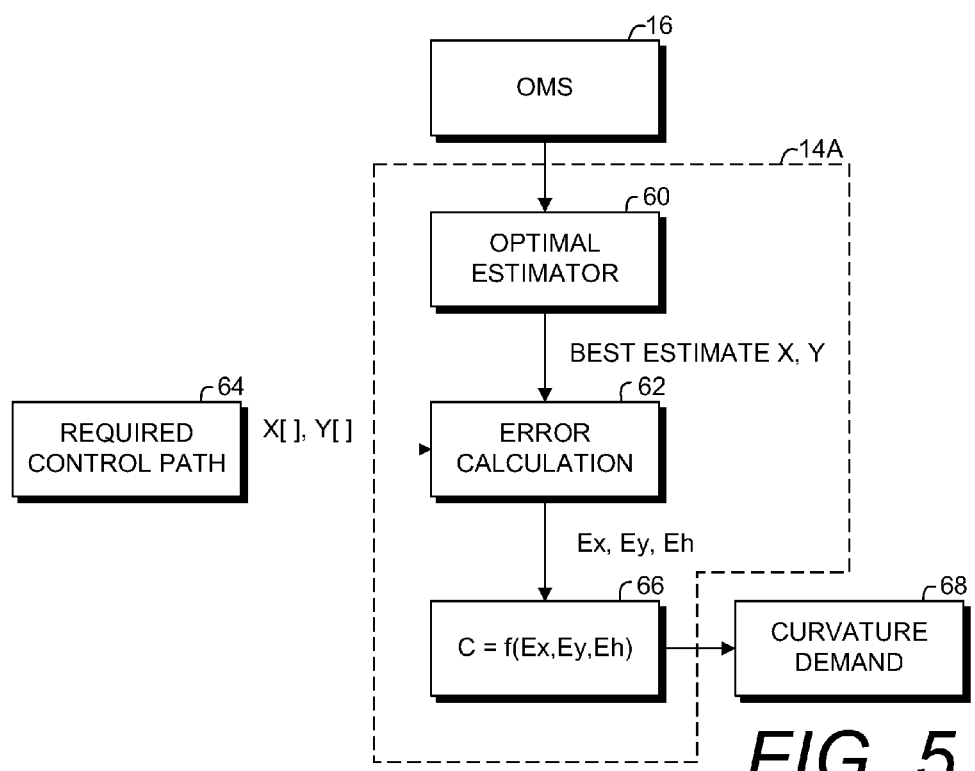
FIG. 5 shows a flow sheet illustrating the interaction of an optical movement sensor with a controller in accordance with an embodiment of the present invention.

FIG. 5 shows a schematic flow sheet of the interaction between the optical movement sensor 16 and the controller 14. The flow sheet is based upon the embodiment shown in FIGS. 1A and 1B. Only one optical movement sensor 16 is shown in FIGS. 1A and 1B. However, as explained above, there could alternatively be two or more optical movement sensors all feeding into the control system, as shown in FIG. 1C. The way that two or more optical movement sensors can be used to measure changes in the vehicle's orientation about its yaw axis has already been explained. However, providing two or more optical movement sensors may also provide the additional benefit of increasing the accuracy of the position and attitude information calculated by the optical estimator (compared with systems that use only a single optical movement sensor) due to the greater amount of information available upon which the estimates can be based.

In FIG. 5, the controller 14 of FIGS. 1A and 1B is shown by dotted outline 14A. The controller of FIG. 5 includes an optimal estimator 60 and an error calculation module 62. The optimal estimator 60 and error calculation module 62 may form part of the computer memory and/or CPU of the controller 14. The particular programs required to run the optimal estimator and error calculation module may be written into the computer memory, downloaded from a network, loaded onto the computer memory via an optical drive, such as a CD drive or a DVD drive, or loaded from any other form of recorded media. Alternatively, the optimal estimator and the error calculation module may be provided in firmware associated with the controller 14. The control system can optionally include a GNSS system.

The optical movement sensor (OMS) 16 of FIGS. 1A and 1B feeds position and attitude data into optimal estimator 60, which acts to process the information from the optical movement sensor 16 to provide a statistically optimal estimate of the position and attitude information received from the optical movement sensor 16. The optimal estimator may include algorithms that receive the position and attitude information from optical movement sensor 16 and convert that position and attitude information into a calculated or determined position and attitude of the tractor 10. This produces a statistically optimal estimate of the calculated or determined position and attitude of the tractor 10.

FIGS. 5-8 schematically represent the operation of the control system in accordance with different embodiments of the invention. However, it is also useful to consider the way in which the vehicle's parameters and dynamics are represented for the purposes of implementing the control system. Those skilled in the art will recognize that a range of methods may be used for this purpose. However, it is considered that one method is to represent the parameters and dynamics in "state space" form.

In state space representations, the variables or parameters used to mathematically model the motion of the vehicle, or aspects of its operation, are referred to as "states" $x_i$. In the present case, the states may include the vehicle's position(x, y), velocity $$\left(\frac{dx}{dt}, \frac{dy}{dt}\right)$$

heading h, radius of curvature r, etc. Hence the states may include $x_1=x$, $x_2=y$, $x_3=h$, $x_4=\dot{h}$, $$x_5 = \frac{dx}{dt} = \frac{dx_1}{dt}, x_6 = \frac{dy}{dt} = \frac{dx_2}{dt}$$

etc. However, it will be appreciated that the choice of states is never unique, and the meaning and implications of this will be well understood by those skilled in the art.

The values for the individual states at a given time are represented as the individual entries in an n×1 "state vector":

$$\underline{X}(t)=[x_1(t)x_2(t)x_3(t)x_4(t)\ldots x_n(t)]^T$$

where n is the number of states.

In general, the mathematical model used to model the vehicle's motion and aspects of its operation will comprise a series of differential equations. The number of equations will be the same as the number of states. In some cases, the differential equations will be linear in terms of the states, whereas in other situations the equations may be nonlinear in which case they must generally be "linearized" about a point in the "state space". Linearization techniques that may be used to do this will be well known to those skilled in this area.

Next, by noting that any $j^{th}$ order linear differential equations can be re-written equivalently as a set j first order linear differential equations, the linear (or linearized) equations that represent the model can be expressed using the following "state" equation:

$$\frac{d}{dt}(\underline{X}(t)) = A\underline{X}(t) + B\underline{U}(t) + E\underline{w}(t)$$

where:
A is an n×n matrix linking the state time derivatives to the states themselves,
$\underline{U}(t)$ is an m×1 matrix containing the external "forcing" inputs in the mathematical model,
B is an n×m matrix linking the state derivatives to the inputs,
m is the number of inputs,
$E\underline{w}(t)$ is a quantity (represented by an n×1 vector) called the "process noise". The process noise represents errors in the model and vehicle dynamics which exist in the actual vehicle but which are not accounted for in the model. As $E\underline{w}(t)$ represents an unknown quantity, its contents are not known. However, for reasons that will be understood by those skilled in this area, in order to allow statistically optimised signal processing and state estimation $E\underline{w}(t)$ is generally assumed to be Gaussian, white, have zero mean and to act directly on the state derivatives. It is also assumed that the process noise element associated with each individual state is uncorrelated with the process noise element of the other states.

The quantities that are desired to be known about the vehicle (the real values for which are generally also measured from the vehicle itself, if possible) are the outputs y, from the model. Each of the outputs generated by the linear (or linearized) model comprises a linear combination of the states $x_i$ and inputs $u_j$, and so the outputs can be defined by the "output" or "measurement" equation:

$$\underline{Y}(t)=C\underline{X}(t)+D\underline{U}(t)+M\underline{v}(t)$$

where
C is a j×n matrix linking the outputs to the states,
D is a j×m matrix linking the outputs to the inputs,
j is the number of outputs, and
$M\underline{v}(t)$ is a quantity (represented by an n×1 vector) called the "measurement noise". The measurement noise represents errors and noise that invariably exist in measurements taken from the actual vehicle. Like $E\underline{w}(t)$ above, $M\underline{v}(t)$ is assumed to be Gaussian, white, have zero mean, to act directly on the state derivatives and to be uncorrelated with the process noise or itself.

Next, it will be noted that both the state equation and the measurement equation defined above are continuous functions of time. However, continuous time functions do not often lend themselves to easy digital implementation (such as will generally be required in implementing the present invention) because digital control systems generally operate as recursively repeating algorithms. Therefore, for the purpose of implementing the equations digitally, the continuous time equations may be converted into the following recursive discrete time equations by making the substitutions set out below and noting that (according to the principle of superposition) the overall response of a linear system is the sum of the free (unforced) response of that system and the responses of that system due to forcing/driving inputs. The recursive discrete time equations are:

$$\underline{X}_{k+1}=F\underline{X}_k+G\underline{U}_{k+1}+L\underline{w}_{k+1}$$

$$\underline{Y}_{k+1}=Z\underline{X}_k+J\underline{U}_{k+1}+N\underline{v}_{k+1}$$

where
k+1 is the time step occurring immediately after time step k,
Z=C, J=D and Nv is the discrete time analog of the continuous time measurement noise $M\underline{v}(t)$.
F is a transition matrix which governs the free response of the system. F is given by:

$$F=e^{A\Delta t}$$

$G\underline{U}_{k+1}$ is the forced response of the system, i.e. the system's response due to the driving inputs. It is defined by the convolution integral as follows:

$$G\underline{U}_{k+1} = \int_0^{\Delta t} e^{A(\Delta t-\tau)}B\underline{U}(t_{k+1}+\tau)d\tau$$

Similarly, the quantity $L\underline{w}_{k+1}$ is the (forced) response of the system due to the random "error" inputs that make up the process noise. Hence, conceptually this quantity may be defined as:

$$L\underline{w}_{k+1} = \int_0^{\Delta t} e^{A(\Delta t-\tau)}E\underline{w}(t_{k+1}+\tau)d\tau$$

However, as noted above, the quantity $E\underline{w}(t)$ is not deterministic and so the integral defining $L\underline{w}_{k+1}$ cannot be performed (even numerically). It is for this reason that it is preferable to use statistical filtering techniques. The optimal estimators shown in FIGS. 5-8 will use such statistical techniques. One particularly favourable technique involves the use of a Kalman filter to statistically optimise the states estimated by the mathematical model.

In general, a Kalman filter operates as a "predictor-corrector" algorithm. Hence, the algorithm operates by first using the mathematical model to "predict" the value of each of the states at time step k+1 based on the known inputs at time step k+1 and the known value of the states from the previous time step k. It then "corrects" the predicted value using actual measurements taken from the vehicle at time step k+1 and the optimised statistical properties of the model. In summary, the Kalman filter comprises the following equations each of which is computed in the following order for each time step:

$$\left.\begin{array}{l}\underline{X}_{k+1|k} = F\underline{X}_{k|k} + G\underline{U}_{k+1}\\ P_{k+1|k} = FP_{k|k}F^T + Q\\ K_{k+1} = P_{k+1|k}Z^T(ZP_{k+1|k}Z^T + R)^{-1}\\ \underline{Y}_{k+1} = Z\underline{X}_{k+1|k} + J\underline{U}_{k+1}\end{array}\right\}\text{predictor}$$

$$\left.\begin{array}{l}\underline{v}_{k+1} = \underline{\hat{Y}}_{k+1} - \underline{Y}_{k+1}\\ \underline{X}_{k+1|k+1} = \underline{X}_{k+1|k} + K_{k+1}\underline{v}_{k+1}\\ P_{k+1|k+1} = (I - K_{k+1}Z)P_{k+1|k}\end{array}\right\}\text{corrector}$$

where
the notation k+1|k means the value of the quantity in question at time step k+1 given information from time step k. Similarly, k+1|k+1 means the value of the quantity at time step k+1 given updated information from time step k+1.

P is the co-variance in the difference between the estimated and actual value of $\underline{X}$.

Q is the co-variance in the process noise.

K is the Kalman gain which is a matrix of computed coefficients used to optimally "correct" the initial state estimate.

R is the co-variance in the measurement noise.

$\hat{Y}$ is a vector containing measurement values taken from the actual vehicle.

υ is a quantity called the "innovation" which is the difference between the measured values actually taken from the vehicle and values for the corresponding quantities estimated by the model.

Figure 12:
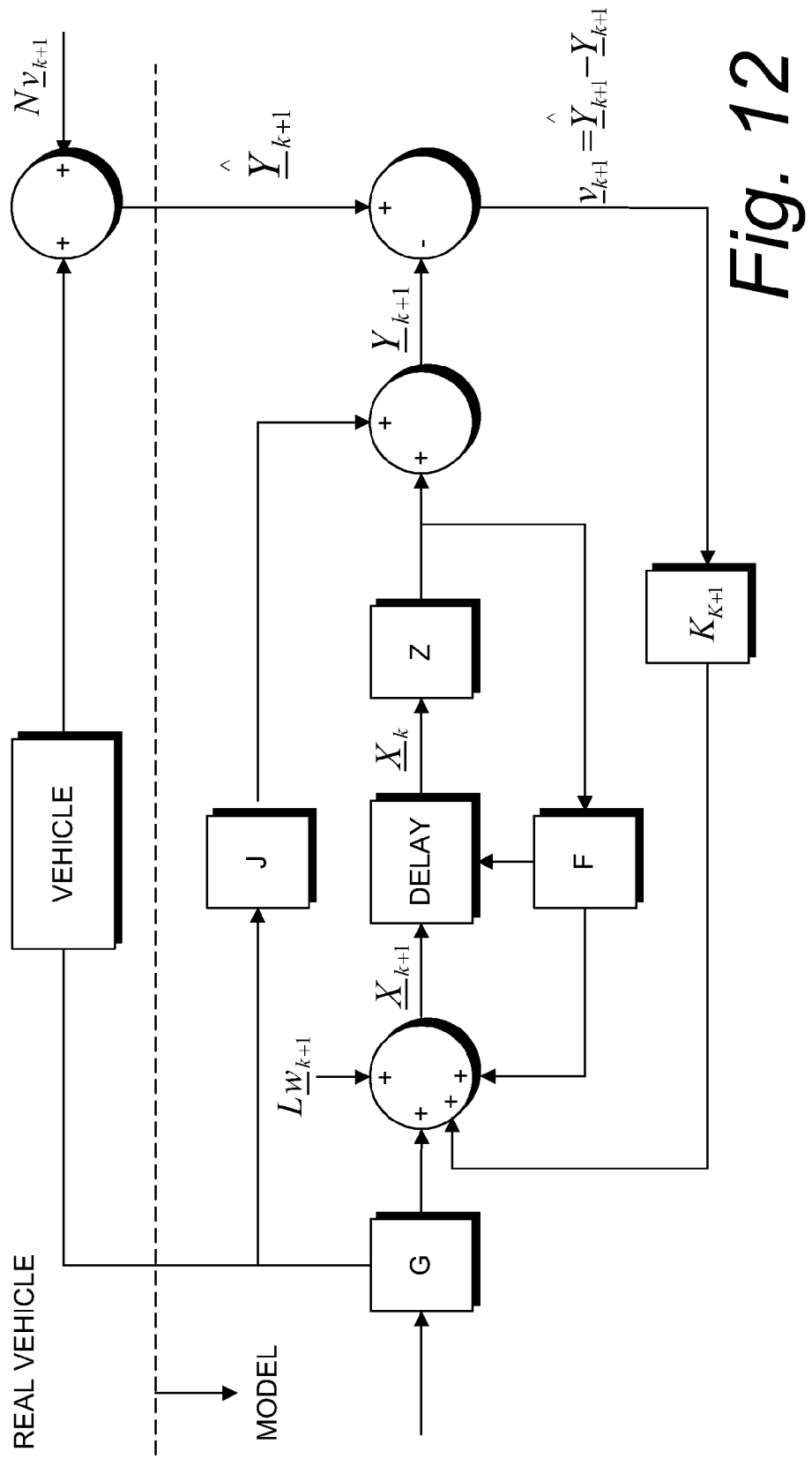
FIG. 12 is a schematic illustration of the operation of a discrete-time Kalman filter, which may be used in an optimal estimator of the present invention.

The operation of the discrete time Kalman filter which may be used in the optimal estimator 60 of the present invention is schematically illustrated in FIG. 12. U denotes a matrix describing the forcing inputs to the Kalman filter model.

Returning now to FIG. 5, the statistically optimal estimate of the vehicle's position and attitude provided by the optimal estimator 60 is supplied to the error calculation module 62. Error calculation module 62 receives information on the required control path 64 (or the desired path of travel). The required control path or the desired path of travel may be entered into the computer memory of the controller or it may be calculated from an initial wayline and further operating parameters, such as the width of the implement being towed by the tractor.

The error calculation module 62 uses the statistically optimal estimate of the position and attitude of the tractor obtained from the estimator 60 and the desired position and attitude of the tractor 10 determined from the required control path to calculate the error in position and attitude. This may be calculated as an error in the x-coordinate, an error in the y-coordinate and/or an error in the heading of the position and attitude of the tractor 10. These error values are represented as "Ex", "Ey" and "Eh" in FIG. 5 and are used in a correction calculation module 66 to determine a correction value. The correction value may result in a curvature demand 68, which represents a steering control signal that is sent to a steering control mechanism. The correction value is calculated as a function of the error in the coordinate values.

Figure 6:
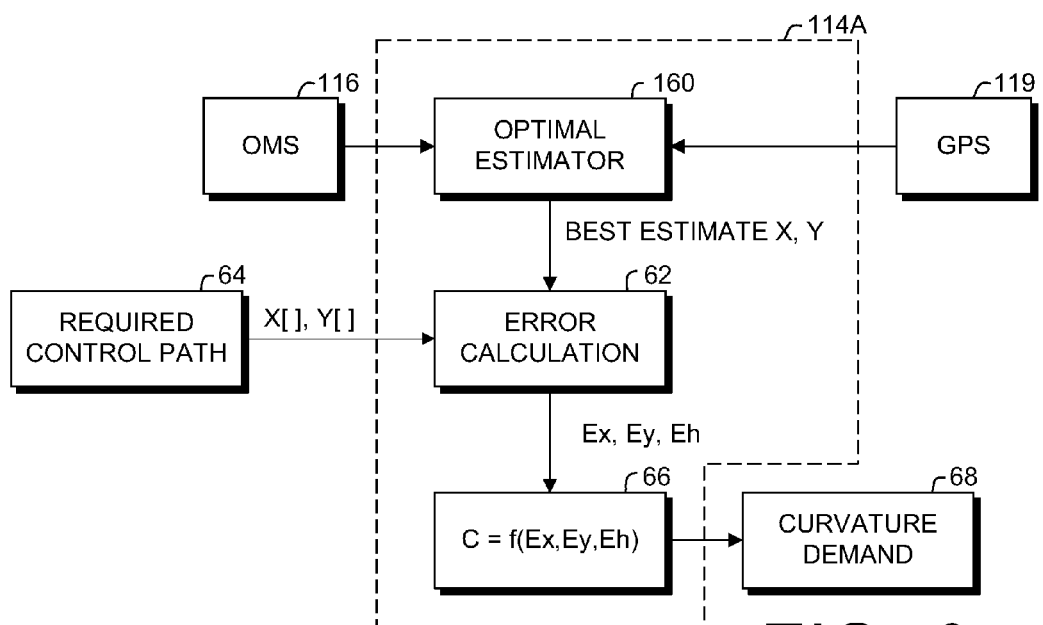
FIG. 6 shows a flow sheet illustrating the interaction of an optical movement sensor and a GNSS sensor with a controller in accordance with an embodiment of the present invention.

FIG. 6 shows a schematic flow sheet of the interaction of the optical movement sensor(s) 116 and the GNSS receiver(s) 113 with the controller 114A. This flow sheet represents one possible implementation for use with the embodiments shown in FIGS. 1A-1C. The error calculation module 62, required control path 64, correction calculation module 66 and curvature demand 68 shown in FIG. 6 are essentially identical to those shown in FIG. 5 and will not be described further. However, as can be seen from FIG. 6, the controller, which is represented by dashed outline 114A, receives positional data from the optical movement sensor(s) (OMS) 116 and the GNSS receiver(s) 113. The GNSS GNSS receiver(s) 113 shown in FIG. 6 may correspond to the differential GNSS system shown in FIG. 2. The optimal estimator 160 receives positional data from the optical movement sensor 116 and the GNSS receiver(s) 113. The optimal estimator 160 analyses the positional data from the optical movement sensor 116 and the GNSS receiver(s) 113 to provide a statistically optimal estimate of the position coordinates of the tractor 110. The GNSS receiver(s) 113 provide absolute position coordinate data and the optical movement system 116 provides relative position and attitude data. Both sources of data can be used to obtain a more accurate calculated or determined position and attitude of the vehicle 111.

In cases where a GNSS outage occurs, the optical movement sensor 116 continues to provide position and attitude data to the optimal estimator 160. In such circumstances, control of the vehicle 111 can be affected by the information received from the optical movement sensor alone.

As a further benefit arising from the system shown in FIG. 6, the optical movement sensor 116 can provide position and attitude data at a much greater frequency than many GNSS systems. Therefore, the position and attitude data received from the optical movement sensor can be used to provide a determined or calculated vehicle position and attitude during periods between receipt of positional data from the GNSS system. This feature assists in maintaining enhanced accuracy in the position and attitude data.

Figure 7:
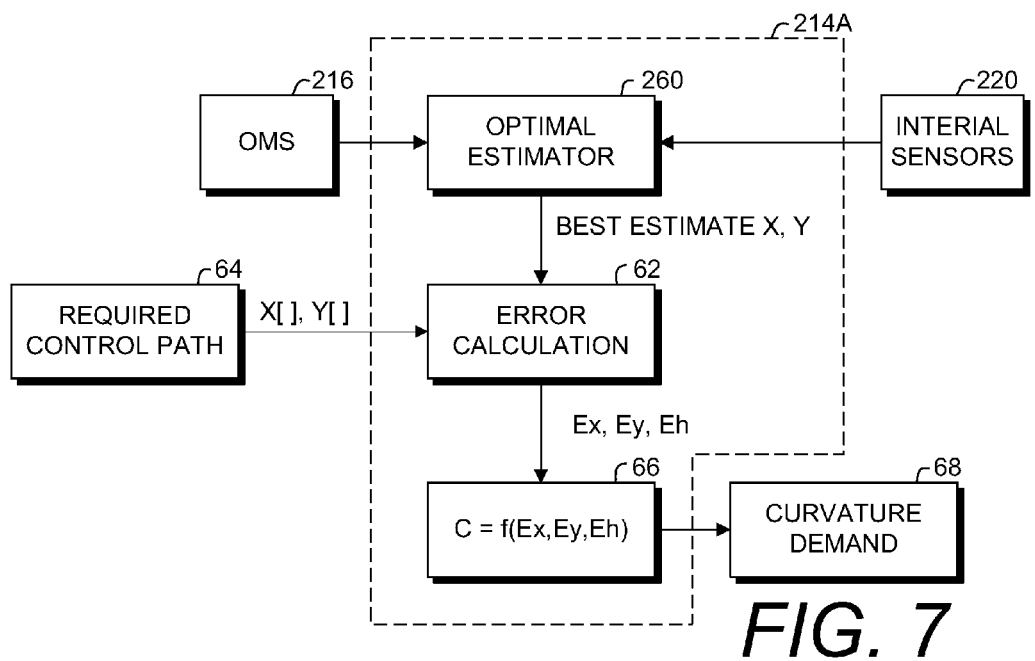
FIG. 7 shows a flow sheet illustrating the interaction of an optical movement sensor and inertial sensors with a controller in accordance with an embodiment of the present invention.

FIG. 7 shows a flow sheet of the interaction of the optical movement sensor(s) 216 and the inertial sensors 221 with the controller 214A. This flow sheet may be used in the embodiment shown in FIG. 3, which can optionally include a GNSS system. The error calculation module 62, desired control path 64, correction calculation module 66 and curvature demand 68 shown in FIG. 7 are essentially identical to those as shown in FIG. 5 and will not be described further. However, as can be seen from FIG. 7, the controller, which is represented by dashed outline 214A, receives positional data from the optical movement sensor(s) 216 and the inertial sensors 221. This positional data is received by the optimal estimator 260. The optimal estimator 260 analyses this data and provides a best estimate of the position of the vehicle.

Figure 8:
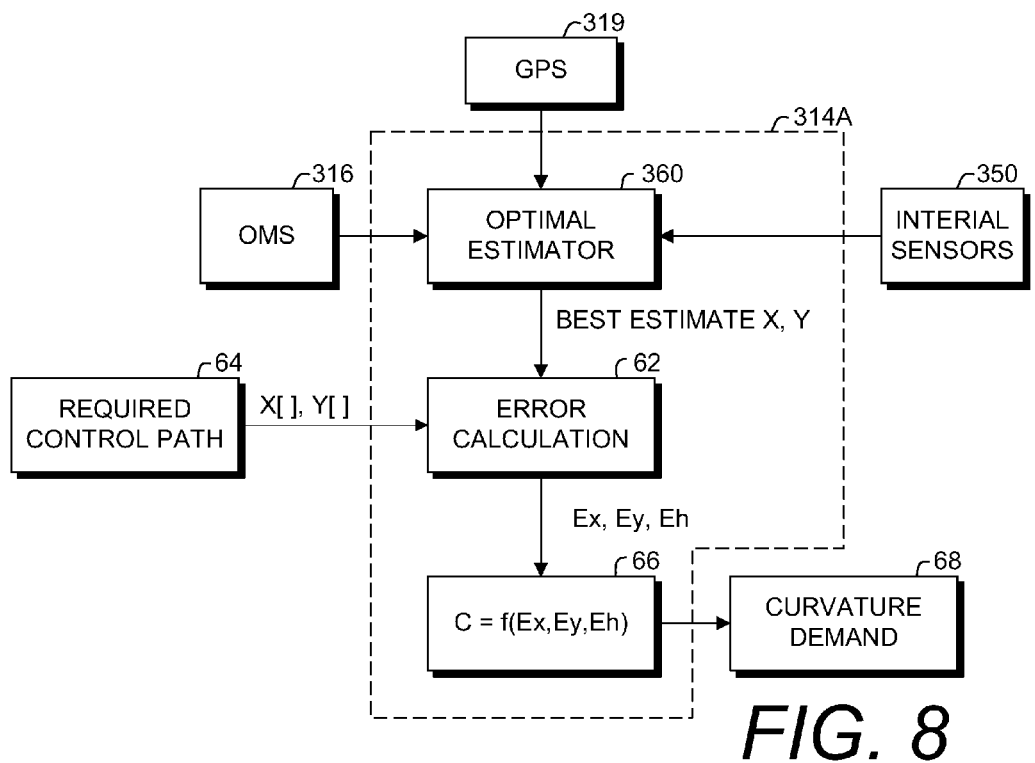
FIG. 8 shows a flow sheet illustrating the interaction of an optical movement sensor, inertial sensors and a GNSS sensor with a controller in accordance with an embodiment of the present invention.

FIG. 8 shows a flow sheet demonstrating the interaction of optical movement sensor(s) 316, inertial sensors 321 and a GNSS receiver(s) 313. The flow sheet shown in FIG. 8 may be used as an implementation for the embodiment shown in FIG. 4. The error calculation module 62, desired control path 64, correction calculation module 66 and curvature demand 68 shown in FIG. 6 are essentially identical to those shown in FIG. 5 and will not be described further. In the embodiment shown in FIG. 8, the optimal estimator 360 receives positional data from the optical movement sensor 316, the GNSS receiver(s) 313 and the inertial sensors 321. This data is sent to the optimal estimator 60 which produces a best estimate of the position of the vehicle. This is then sent to the error calculation module 62.

FIG. 9 shows a schematic view of another embodiment of the present invention in which an optical movement sensor 416 is mounted on a gimbal mount 419, which in turn is mounted on an implement 412. Two optical movement sensors 416 are mounted on the front end of a tractor 410. FIG. 9 shows only one optical movement sensor 416 on the implement 412. However, two or more optical movement sensors 416 may be provided on the implement 412. In the embodiment shown in FIG. 9, the optical movement sensor(s) 416 is used to provide positional data relating to the position of the implement 412. The control system shown in FIG. 9 also includes a GNSS receiver(s) 413, a controller 414, a steering valve block 415 and a GUI 417, all of which function similarly to corresponding components described above.

The embodiments shown in FIGS. 2-4 may also be modified by replacing the optical movement sensors in those embodiments with an optical movement sensor(s) mounted on the implement(s) (similar to FIG. 9). It will also be appreciated that the position of the implement may be determined as well as the position of the tractor. In such cases, an optical movement sensor mounted on the implement 12 (as shown in FIG. 9) may comprise an additional optical movement sensor to the optical movement sensor(s) mounted on the tractor, as shown in FIGS. 1 to 4.

Figure 10:
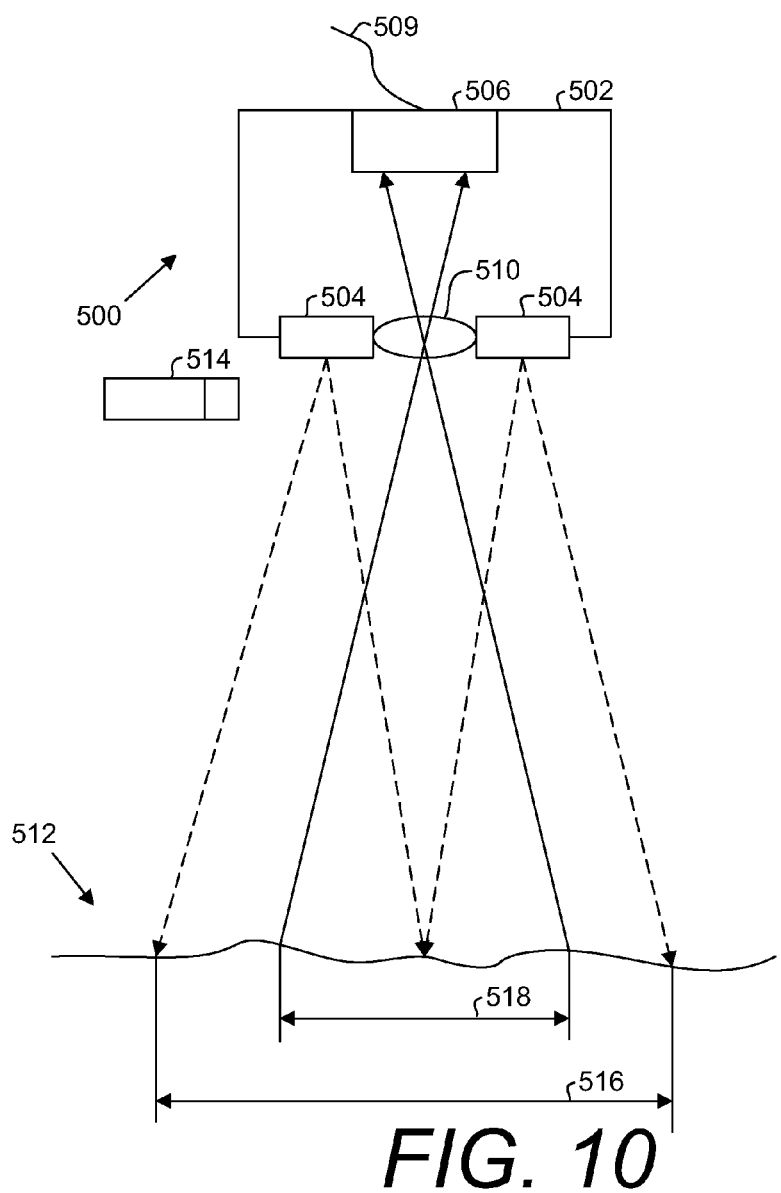
FIG. 10 shows a schematic diagram of one possible arrangement for an optical movement sensor that could be used in the present invention.
Figure 11:
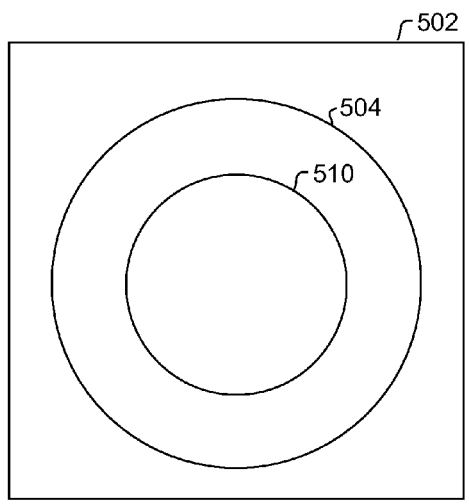
FIG. 11 shows an end view of the lens and LED illuminator ring used in the arrangement of FIG. 10.

FIG. 10 shows a schematic diagram of one possible embodiment of an optical movement sensor 500 that may be used in the present invention. The optical movement sensor 500 shown in FIG. 10 includes a housing or enclosure 502. Housing 502 holds an illumination source 504, in the form of a ring of LEDs 504. The ring of LEDs is shown more clearly in FIG. 11. The housing 502 also houses a charged coupled device (CCD) detector and an integrated optical movement sensor chip 506. The detector and optical movement sensor chip 506 is suitably taken from an optical computer mouse. The housing 502 also houses a lens 510 (which will suitably be a telecentric lens). Light from the ring of LEDs that is reflected from the ground 512 is focused by the lens 510 onto the detector 506. In order to keep the lens 510 free of dirt and debris, a nozzle 514 may be positioned close to the lens 510. The nozzle 514 may periodically or continuously blow a jet of air over the lens 510 to thereby blow away any dirt or debris that may have settled on the lens. FIG. 10 also shows the field of illumination 516 and the field of view 518 provided by the sensor 500. The optical movement chip 506 sends signals to the optimal estimator, as shown in FIGS. 5 to 8. These signals may be sent via a wire 509 or via an appropriate wireless connection.

The present invention provides control systems that can be used to control the movement of the vehicle and/or an implement associated with the vehicle. The control system includes an optical movement sensor that may be the operative part of an optical computer mouse. These optical movement sensors are relatively inexpensive, provide a high processing rate and utilise proven technology. Due to the high processing rate of such optical movement sensors, the control system has a high clock speed and therefore a high frequency of updating of the determined or calculated position of the vehicle or implement. The optical movement sensor may be used by itself or it may be used in conjunction with a GNSS system, one or more inertial sensors, or one or more vehicle based sensors. The optical movement sensor can be used to augment the accuracy of inertial and/or other sensors. In particular, the optical movement sensor can be used to debias yaw drift that is often inherent in inertial sensors.

Those skilled in the art will appreciate that the present invention may be susceptible to variations and modifications other than those specifically described. It is to be understood that the present invention encompasses all such variations and modifications that fall within its spirit and scope.

Having thus described the invention, what is claimed as new and desired to be secured by Letters Patent is:

1. A system for guiding an agricultural vehicle, which system includes:
   a controller mounted on said vehicle and adapted for computing guidance signals;
   a guidance subsystem mounted on said vehicle and connected to said controller, said guidance subsystem being adapted for receiving said guidance signals from said controller and utilizing said guidance signals for guiding said vehicle;
   an optical movement sensor subsystem mounted on said vehicle and adapted for optically sensing movement of said vehicle relative to a surface over which said vehicle is traveling;
   said optical movement sensor subsystem including an optical movement sensor connected to said controller and adapted for providing optically-sensed vehicle movement signals thereto corresponding to optically-sensed relative vehicle movement;
   said controller being adapted for computing said guidance signals utilizing said vehicle movement signals;
   a global navigation satellite system (GNSS) positioning subsystem mounted on said vehicle and adapted for providing GNSS-derived position signals to said controller;
   said controller using said GNSS-derived position signals for computing said guidance signals;
   said GNSS positioning subsystem including a pair of antennas mounted on said vehicle;
   said antennas receiving GNSS ranging signals corresponding to their respective geo-reference locations;
   said processor being adapted for computing an attitude of said vehicle using ranging differences between the GNSS signals received by said antennas;
   said GNSS antennas being mounted on said vehicle in transversely-spaced relation;
   said vehicle including a motive component and an implement connected to said motive component;
   a GNSS antenna mounted on said implement and connected to said GNSS receiver;
   said guidance subsystem being adapted for automatically steering said vehicle utilizing said positioning signals to accommodate an offset between said tractor and implement and correct relative positioning of said tractor and implement to maintain said implement on a guide path;
   said guidance subsystem including an hydraulic steering valve block connected to said controller and to a steering mechanism of said vehicle;
   said guidance subsystem including a graphic user interface (GUI) adapted for displaying a guide path of said vehicle;
   a GNSS base station including a radio transmitter and a radio receiver;
   said vehicle including an RF receiver adapted to receive RF transmissions from said base station;
   a real-time kinematic (RTK) correction subsystem using carrier phase satellite transmissions with said vehicle in motion;
   an optical movement sensor subsystem;
   said optical movement sensor subsystem including an optical movement sensor and an optimal estimator providing a statistically optimal estimate of the position and attitude information received from the optical movement sensor; and said optimal estimator including algorithms that receive the position and attitude information from the optical movement sensor and converts said information into a calculated or determined position and attitude of said vehicle producing a statistically optimal estimate of the calculated or determined position and attitude of said vehicle.

2. The vehicle guidance system according to claim 1 wherein said optical movement sensor subsystem includes:
a pair of said optical movement sensors fixedly mounted in spaced relation on said vehicle.

3. The vehicle guidance system according to claim 1, which includes:
a GNSS antenna mounted on said implement and connected to said GNSS receiver.

4. The method according to claim 1, which includes the additional steps of:
providing a gimbal mount mounting said optical movement sensor on said vehicle; and
said gimbal mount maintaining an orientation of said optical movement sensor independent of said vehicle attitude.

5. A method of guiding an agricultural vehicle, which includes the steps of:
mounting a controller on a vehicle and computing guidance with said controller;
mounting a guidance subsystem on said vehicle and connecting said guidance subsystem to said controller;
receiving said guidance signals with said guidance subsystem from said controller and utilizing said guidance signals for guiding said vehicle;
mounting an optical movement sensor subsystem on said vehicle and optically sensing movement of said vehicle relative to a surface over which said vehicle is traveling;
providing said optical movement sensor subsystem with an optical movement sensor connected to said controller and providing optically-sensed vehicle movement signals to said controller corresponding to optically-sensed relative vehicle movement;
said optical movement sensor subsystem including an optimal estimator providing a statistically optimal estimate of the position and attitude information received from the optical movement sensor; and
providing said optimal estimator with algorithms that receive the position and attitude information from the optical movement sensor and convert said information into a calculated or determined position and attitude of said vehicle producing a statistically optimal estimate of the calculated or determined position and attitude of said vehicle;
said controller computing guidance signals utilizing said vehicle movement signals;
providing a global navigation satellite system (GNSS) positioning subsystem mounted on said vehicle and providing GNSS-derived position signals to said controller;
providing said GNSS positioning subsystem with a pair of antennas mounted on said vehicle;
receiving with said antennas GNSS ranging signals corresponding to their respective geo-reference locations;
computing with said processor an attitude of said vehicle using ranging differences between the GNSS signals received by said antennas;
mounting said GNSS antennas on said vehicle in transversely-spaced relation;
providing said vehicle with a motive component and an implement connected to said motive component;
mounting a GNSS antenna on said implement and connecting said implement-mounted GNSS antennas to said GNSS receiver; and
said guidance subsystem automatically steering said vehicle utilizing said positioning signals to accommodate an offset between said tractor and said implement and to maintain said implement on a guide path.

6. The method according to claim 5, which includes the additional steps of:
providing said optical movement sensor subsystem with an optical movement sensor;
mounting said optical movement sensor on said vehicle with a gimbal mount; and
said gimbal mount maintaining an orientation of said optical movement sensor independent of said vehicle orientation.

7. The method according to claim 5, which includes the additional steps of:
providing said optical movement sensor subsystem with a pair of optical movement sensors; and
fixedly mounting said optical movement sensors in spaced relation on said vehicle.

* * * * *